United States Patent
Hyun

(10) Patent No.: US 8,964,261 B2
(45) Date of Patent: Feb. 24, 2015

(54) DOCUMENT READING DEVICE AND IMAGE FORMING APPARATUS

(71) Applicant: Fuji Xerox Co., Ltd., Minato-ku, Tokyo (JP)

(72) Inventor: Geemyug Hyun, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 14/100,683

(22) Filed: Dec. 9, 2013

(65) Prior Publication Data

US 2014/0333976 A1    Nov. 13, 2014

(30) Foreign Application Priority Data

May 9, 2013    (JP) .................................. 2013-099346

(51) Int. Cl.
*H04N 1/04* (2006.01)
*H04N 1/10* (2006.01)
*H04N 1/00* (2006.01)

(52) U.S. Cl.
CPC ......... *H04N 1/1013* (2013.01); *H04N 1/00278* (2013.01)
USPC ............................ 358/474; 358/497; 358/501

(58) Field of Classification Search
CPC .................... G03G 15/60; G03G 2215/00316; G03G 15/507; G03G 15/605; G03G 21/02; G03G 2215/00189; G03G 2215/00282; G06F 17/30017; B41J 11/0065; B41J 11/008
USPC ................. 358/474, 497, 496, 501, 505, 498; 399/367
See application file for complete search history.

(56) References Cited

U.S. PATENT DOCUMENTS

| | | | | |
|---|---|---|---|---|
| 5,920,381 A * | 7/1999 | Katsuta | ......................... | 271/259 |
| 5,999,580 A * | 12/1999 | Sakoda et al. | ................ | 375/354 |
| 6,753,982 B1 * | 6/2004 | Sheng et al. | .................. | 358/474 |
| 7,639,404 B2 * | 12/2009 | Ikeno et al. | .................... | 358/461 |
| 8,004,726 B2 * | 8/2011 | Misaka | ......................... | 358/474 |
| 8,253,986 B2 * | 8/2012 | Ikeno et al. | .................... | 358/461 |
| 8,326,204 B2 * | 12/2012 | Won | .............................. | 399/367 |
| 8,379,270 B2 * | 2/2013 | Tomomatsu | ................. | 358/3.06 |
| 8,427,718 B2 * | 4/2013 | Omoya | ......................... | 358/475 |
| 8,542,415 B2 * | 9/2013 | Takeuchi et al. | .............. | 358/498 |
| 8,605,339 B2 * | 12/2013 | Motoyama | .................... | 358/474 |
| 8,659,802 B2 * | 2/2014 | Ikeno et al. | .................... | 358/461 |
| 2011/0255130 A1 * | 10/2011 | Omoya | ......................... | 358/1.15 |

FOREIGN PATENT DOCUMENTS

JP          07-273948 A    10/1995

* cited by examiner

*Primary Examiner* — Negussie Worku
(74) *Attorney, Agent, or Firm* — Sughrue Mion, PLLC

(57) ABSTRACT

A document reading device includes a reading table, an openable member, a detection member, an open and close movement member, a reading member, a reading movement member, and a controller. The reading table, which allows a document to be placed thereon, is covered or uncovered by closing or opening the openable member. The open and close movement member is moved as the openable member is opened or closed. The open and close movement member positioned at the detection position is detected by the detection member. The reading member reads the document on the reading table while being moved by a drive force controlled by the controller. The reading movement member is moved as the reading member is moved. The reading movement member positioned at the detection position is detected by the detection member.

7 Claims, 18 Drawing Sheets

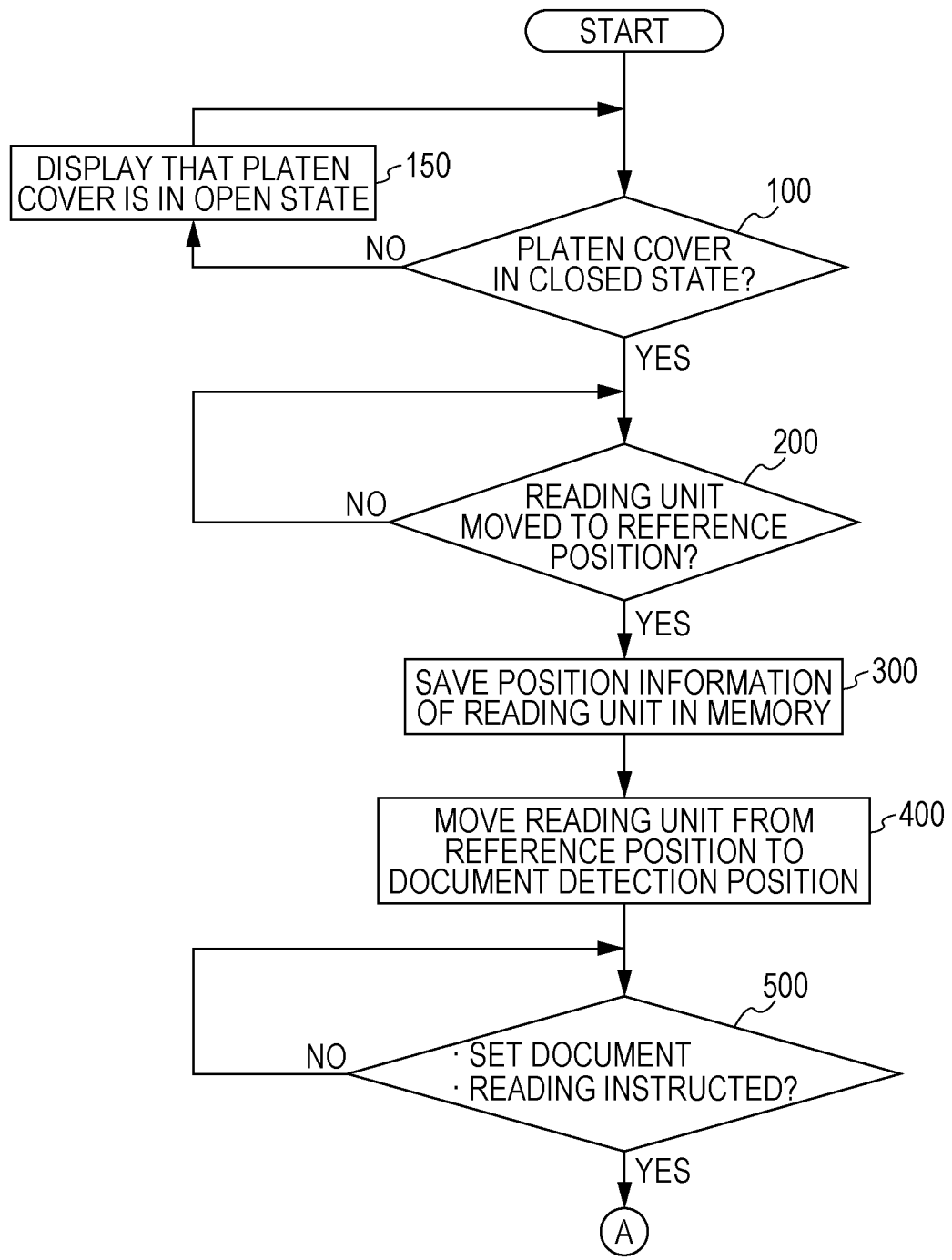

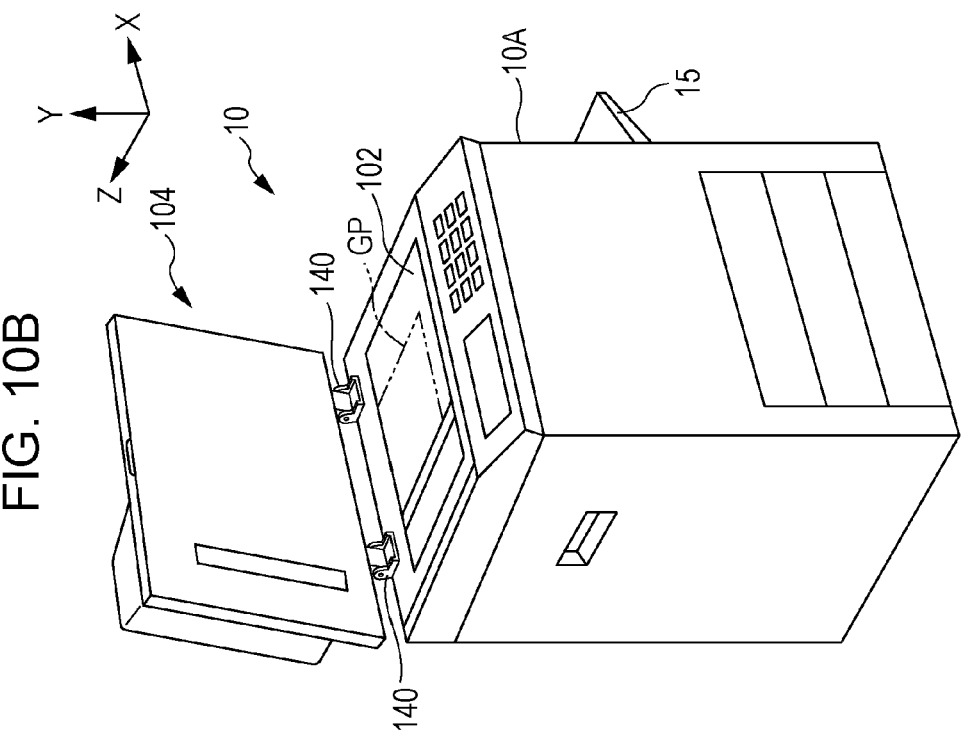
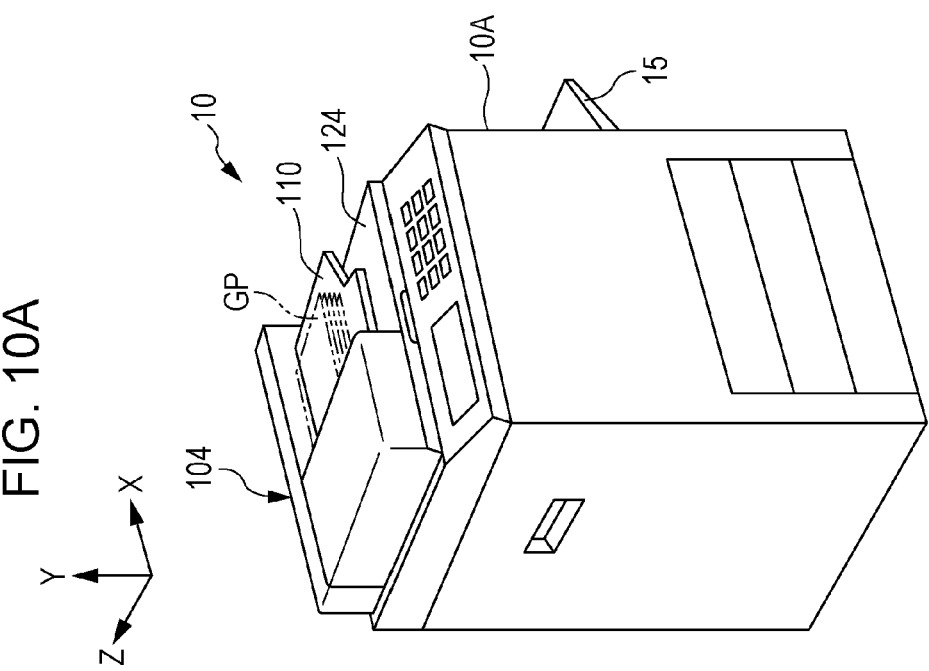

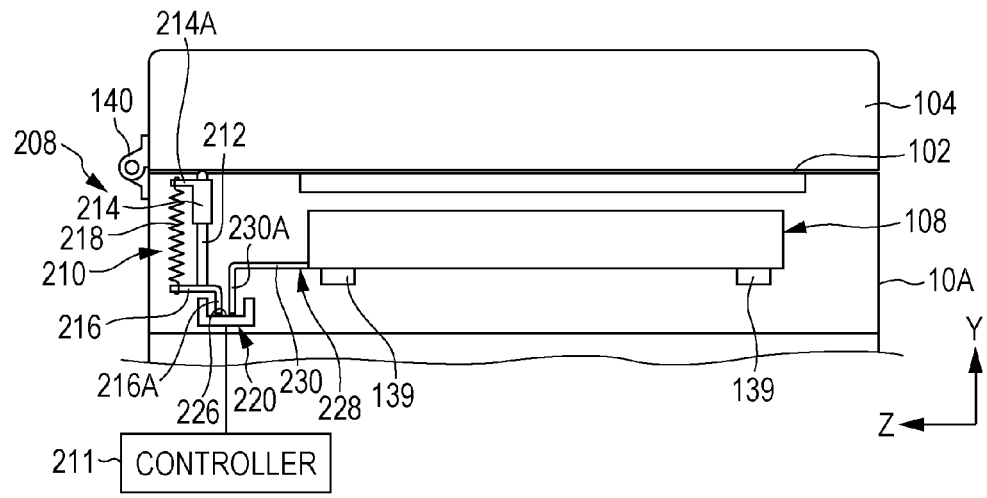
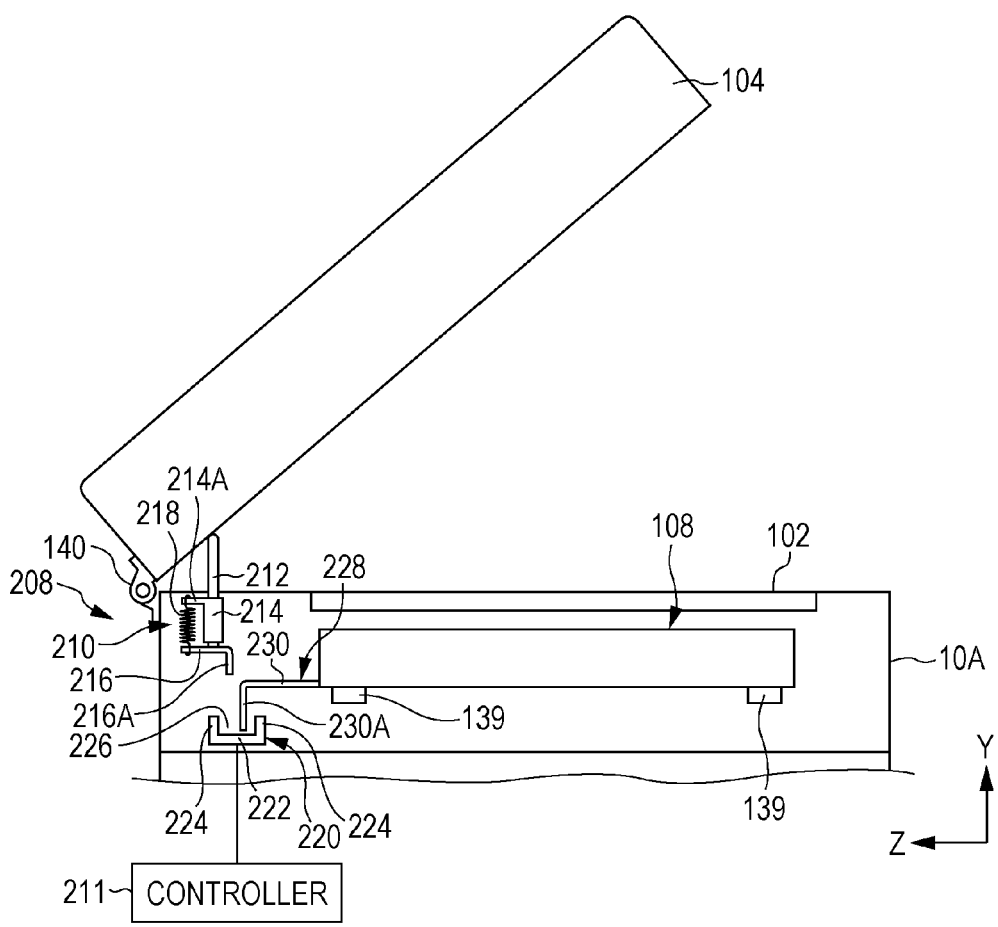

DOCUMENT READING DEVICE AND IMAGE FORMING APPARATUS

CROSS-REFERENCE TO RELATED APPLICATIONS

This application is based on and claims priority under 35 USC 119 from Japanese Patent Application No. 2013-099346 filed May 9, 2013.

BACKGROUND

Technical Field

The present invention relates to a document reading device and an image forming apparatus equipped with the document reading device.

SUMMARY

According to an aspect of the present invention, a document reading device includes a reading table, an openable member, a detection member, an open and close movement member, a reading member, a reading movement member, and a controller. The reading table allows a document to be placed on the reading table. The reading table is covered or uncovered by closing or opening the openable member. The detection member has a detection position. The open and close movement member is moved as the openable member is opened or closed. When the openable member is in an open state or a closed state, the open and close movement member is positioned at the detection position and detected by the detection member. The reading member reads the document placed on the reading table while the reading member is being moved by a drive force transmitted to the reading member. The reading movement member is moved as the reading member is moved. When the reading member has been moved to a reference position of the reading member, the reading movement member is positioned at the detection position and detected by the detection member. The controller controls the drive force so as to cause the reading movement member to be moved to the detection position when the open and close movement member has been moved to a position different from the detection position.

BRIEF DESCRIPTION OF THE DRAWINGS

Exemplary embodiments of the present invention will be described in detail based on the following figures, wherein:

FIG. 2 is a flowchart illustrating part of a flow in which an image is read by the document reading unit according to the first exemplary embodiment of the present invention;

FIGS. 10A and 10B are perspective views illustrating an image forming apparatus according to a first exemplary embodiment of the present invention;

FIGS. 16A and 16B are front views illustrating the document reading unit according to the third exemplary embodiment of the present invention;

DETAILED DESCRIPTION

First Exemplary Embodiment

Examples of a document reading device and an image forming apparatus according to a first exemplary embodiment of the present invention will be described with reference to FIGS. 1A to 12.

Image Forming Apparatus: General Structure

Figure 12:
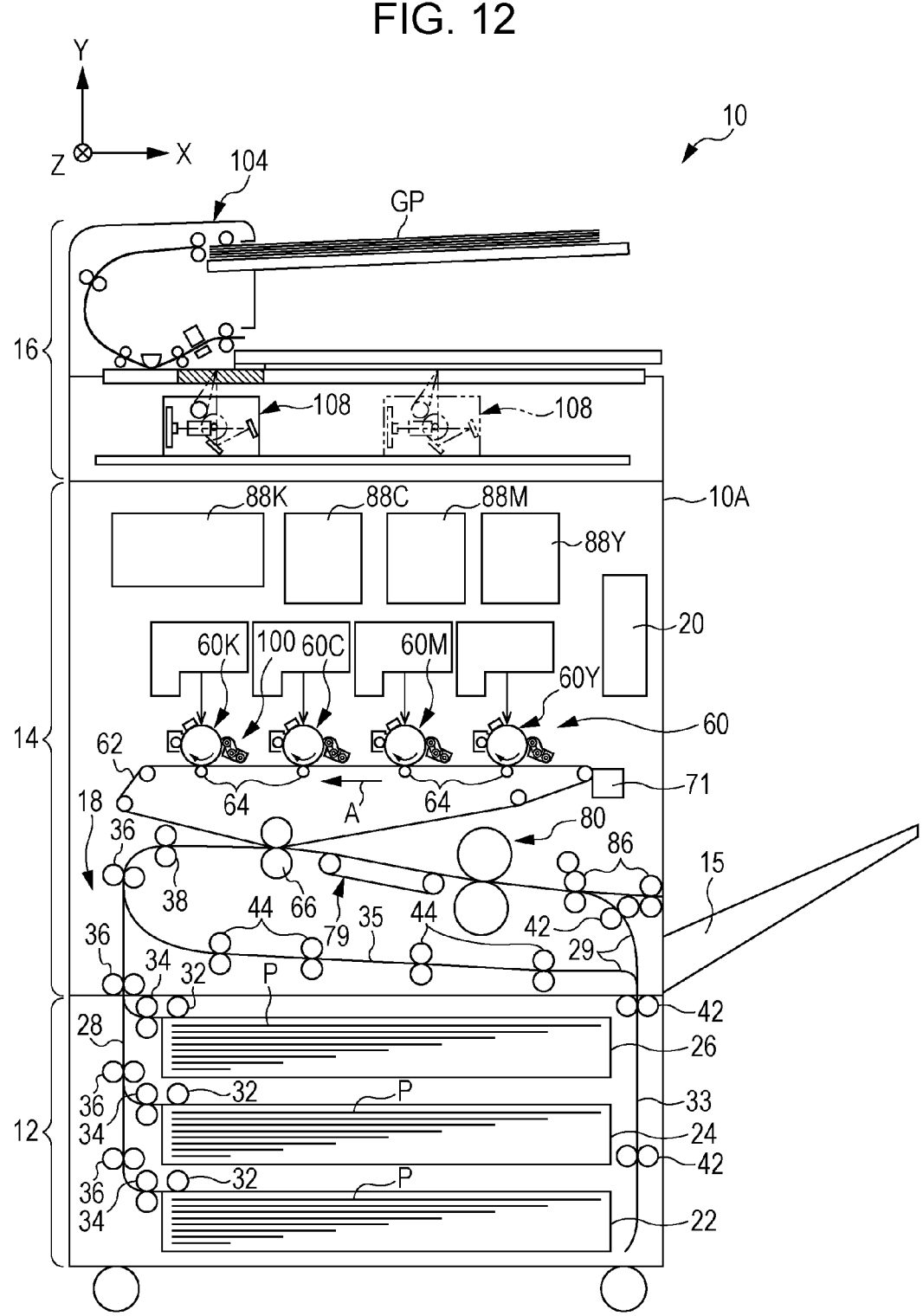
FIG. 12 schematically illustrates the configuration of the image forming apparatus according to the first exemplary embodiment of the present invention.

FIG. 12 illustrates an image forming apparatus 10. The image forming apparatus 10 includes a sheet containing section 12, an image forming section 14, a document reading unit 16, a controller 20, and a transport unit 18. Sheet members P, each of which is an example of a recording medium, are stacked in the sheet containing section 12 from a lower side to an upper side in an up-down direction (arrow Y direction). The image forming section 14 is provided above the sheet containing section 12 and forms an image on the sheet member P supplied from the sheet containing section 12. The document reading unit 16 serves as an example of the document reading device, provided above the image forming section 14, and reads a document sheet member GP as a document. The controller 20 is provided in the image forming section 14 and controls operations of components of the image forming apparatus 10. The transport unit 18 transports the sheet member P to the components. The details of the structure of the document reading unit 16 will be described later.

Hereafter, in front view of the image forming apparatus 10, the up-down direction of an apparatus body 10A is referred to as an apparatus up-down direction (Y-direction in, for example, FIG. 12), the horizontal direction of the apparatus body 10A is referred to as an apparatus width direction (X-direction in, for example, FIG. 12), and the depth direction of the apparatus body 10A is referred to as an apparatus depth direction (Z-direction in, for example, FIG. 12).

Sheet Containing Section

The sheet containing section 12 includes a first container 22, a second container 24, and a third container 26, which contain respective sizes of the sheet members P, the sizes being different from one another. The first to third containers 22, 24, and 26 each include a feed roller 32. The sheet members P contained in the containers 22, 24, and 26 are fed to a transport path 28, which is part of the transport unit 18, by the respective feed rollers 32.

Transport Unit

The transport unit 18 is disposed downstream of the feed rollers 32 in a sheet member P transport direction and includes pairs of transport rollers 34 and pairs of transport rollers 36. The sheet members P are transported one after another by the transport rollers 34 and 36. A registration roller 38 is disposed downstream of the transport rollers 36 in the sheet member P transport direction. The registration roller 38 temporarily stops the sheet member P and feeds the sheet member P to a second transfer position, which will be described later, at predetermined timing.

Also in the transport path 28, plural transport rollers 86 are disposed downstream of a fixing device 80, which will be described later, in the sheet P transport direction. The transport rollers transport the sheet member P, onto which a toner image has been fixed, to a sheet output unit 15.

An upstream portion of the transport path 28 of the transport unit 18 (portion where the transport rollers 36 are disposed) straightly extends toward the upper side in the apparatus up-down direction from a left side of the sheet containing section 12 to a lower left portion of the image forming section 14 in front view of the image forming apparatus 10. The downstream side of the transport path 28 of the transport unit 18 extends from the lower left portion of the image forming section 14 to the sheet output unit 15 disposed on the right side of the image forming section 14. Furthermore, the transport unit 18 includes a duplex-printing transport path 29 connected to the transport path 28. When forming images on both sides of the sheet member P, the sheet member P is transported and inverted in the duplex-printing transport path 29.

The duplex-printing transport path 29 has a first inverting path 33, a second inverting path 35, and a switching member (not illustrated). The first inverting path 33 straightly extends in the apparatus up-down direction from the lower right portion of the image forming section 14 to the right side of the sheet containing section 12 in front view of the image forming apparatus 10. The sheet member P having been transported into the first inverting path 33 enters the second inverting path 35 the trailing end thereof first and is transported to the left side in the apparatus width direction through the second inverting path 35. The switching member switches among the transport path 28, the first inverting path 33, and the second inverting path 35. Pairs of transport rollers 42 are provided at plural positions spaced apart from one another in the first inverting path 33. Pairs of transport rollers 44 are provided at plural positions spaced apart from one another in the second inverting path 35.

A downstream end portion of the second inverting path 35 is connected to a near side (upstream side) of a pair of the transport rollers 36, which are disposed on the most downstream side out of the plural pairs of the transport rollers 36 disposed in the upstream portion of the transport path 28, by a guide member (not illustrated).

Image Forming Section

The image forming section 14 includes four image forming units 60, an intermediate transfer belt 62, four first transfer rollers 64, and a second transfer roller 66. The image forming units 60 each form a developer image (toner image). The intermediate transfer belt 62 is rotatable (movable in a circumferential path) in an arrow A direction in, for example, FIG. 12 and carries toner images on its outer circumference. The first transfer rollers 64 each transfer the toner image formed by a corresponding one of the image forming units 60 onto the intermediate transfer belt 62 through first transfer. The second transfer roller 66 transfers the toner images on the intermediate transfer belt 62 onto the sheet member P through second transfer.

Figure 11:
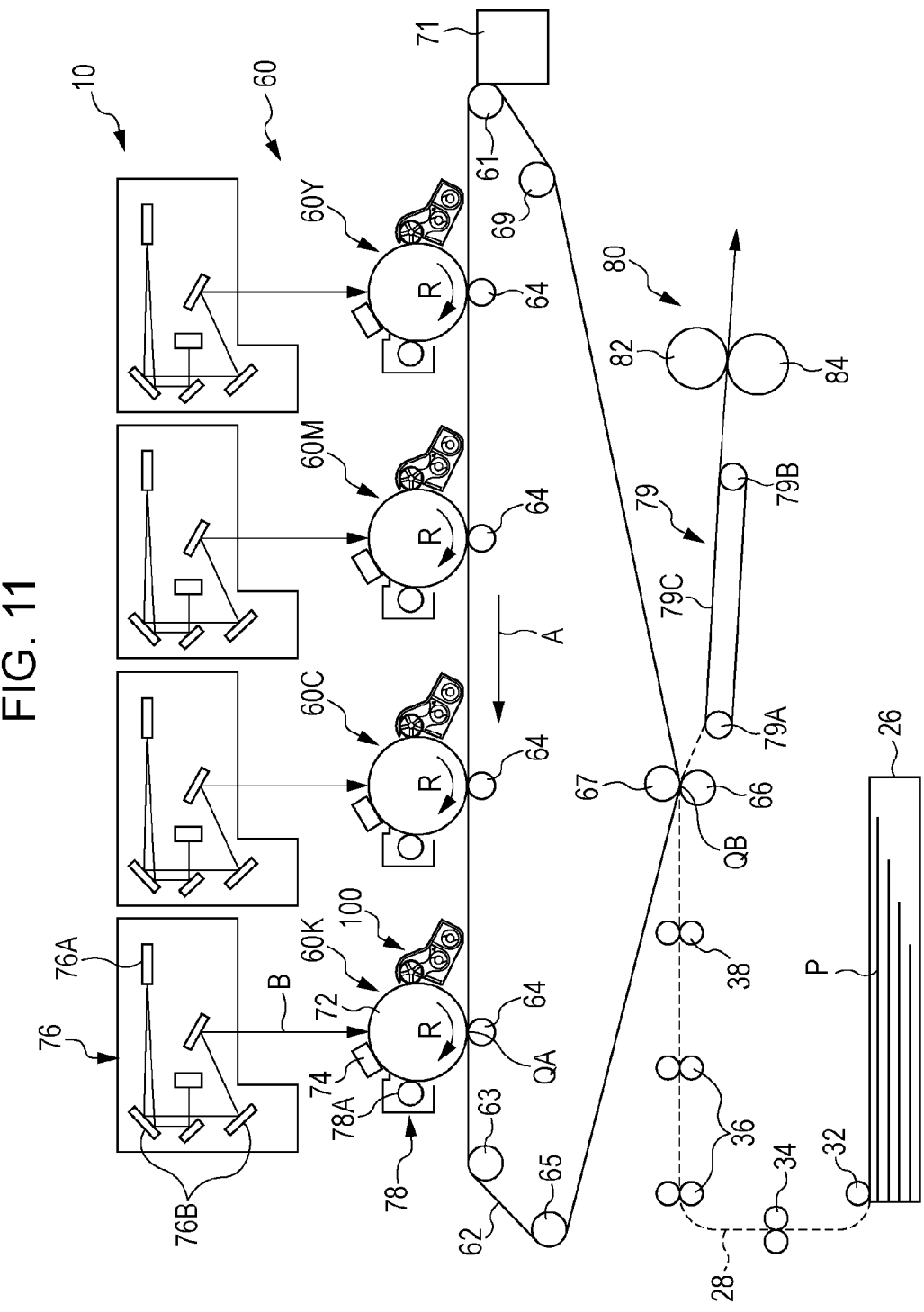
FIG. 11 illustrates the configuration of image forming units of the image forming apparatus according to the first exemplary embodiment of the present invention.

As illustrated in FIG. 11, the image forming units 60 include, for example, plural image forming units 60Y, 60M, 60C, and 60K, which each form a toner image of a corresponding one of four colors, that is, yellow (Y), magenta (M), cyan (C), and black (K).

The image forming units 60Y, 60M, 60C, and 60K have the same basic structure despite the difference in the colors of toner they use. Thus, the image forming unit 60K is described, and representation of the reference signs in the drawings and description of the other image forming units 60Y, 60M, and 60C are omitted. Hereafter, in the case where identification of the color of toner (Y, M, C, or K) is desired for a component of the image forming units 60Y, 60M, 60C, or 60K, the reference sign of this component may be followed by a suffix Y, M, C, or K that indicates a toner color for identification of the color. Otherwise, the suffixes Y, M, C, and K may be omitted in the description of the components.

The image forming unit 60K includes a photoconductor body 72, a charging unit 74, an exposure device 76, a developing device 100, and a cleaning unit 78. The photoconductor body 72 serves as an example of an image carrying member that carries an electrostatic latent image and a toner image on its outer circumferential surface. The charging unit 74 charges the outer circumferential surface of the photoconductor body 72. The exposure device 76 exposes with light the outer circumferential surface of the photoconductor body 72 having been charged so as to form an electrostatic latent image on the photoconductor body 72. The developing device 100 develops the electrostatic latent image formed on the photoconductor body 72 with the K color toner so as to form a toner image (K color). The cleaning unit 78 cleans the outer circumferential surface of the photoconductor body 72 after first transfer has been performed.

The photoconductor body 72 having a cylindrical shape opposes the intermediate transfer belt 62 with the axial direction thereof extending in the same direction as the width direction of the intermediate transfer belt 62. The photoconductor body 72 is supported such that the photoconductor body 72 is rotatable in an arrow R direction (circumferential direction and clockwise in, for example, FIG. 11) by a drive unit (not illustrated). The charging unit 74 uses, for example, a scorotron charger which charges the outer circumferential surface of the photoconductor body 72 through discharge to the same polarity (for example, negative polarity) as the polarity to which the toner is charged.

The exposure device 76 includes a semiconductor laser (not illustrated), an f-θ lens (not illustrated), a polygon mirror 76A, an imaging lens (not illustrated), and plural mirrors 76B. The exposure device 76 causes the polygon mirror 76A to deflect a laser beam B emitted from the semiconductor laser so as to scan the outer circumferential surface of the photoconductor body 72, which has been charged by the charging unit 74, in accordance with the K (black) color image information. Thus, the outer circumferential surface of the photoconductor body 72 is irradiated with (exposed to) the laser beam B, thereby forming an electrostatic latent image on the outer circumferential surface of the photoconductor body 72.

The cleaning unit 78 includes a clearing roller 78A having the axis in the same direction as that of the photoconductor body 72. The clearing roller 78A is rotated while being in contact with the outer circumferential surface of the photoconductor body 72, thereby collecting the toner, dust, and the like remaining on the outer circumferential surface of the photoconductor body 72 after first transfer has been performed.

The intermediate transfer belt 62 is generally formed of, for example, polyimide resin and has a cylindrical shape. A drive roller 61, the first transfer rollers 64, a support roller 63, a tension applying roller 65, an opposing roller 67, and a support roller 69 are provided inside the loop of the intermediate transfer belt 62 so as to be rotatable counterclockwise in, for example, FIG. 11. The drive roller 61 moves the intermediate transfer belt 62 from the upstream side to the downstream side as indicated by the arrow A. Each of the first transfer rollers 64, to which a voltage is applied, causes the toner image to be transferred onto the intermediate transfer belt 62 through first transfer by using the potential difference between the first transfer roller 64 and a corresponding one of the photoconductor bodies 72 (grounded). The support roller 63 supports the intermediate transfer belt 62 from the inside. The tension applying roller 65 applies tension to the intermediate transfer belt 62. The opposing roller 67, which serves as a counter electrode of the second transfer roller 66, is disposed inside the intermediate transfer belt 62 at the second transfer position.

The intermediate transfer belt 62 is supported by being looped over the drive roller 61, four first transfer rollers 64, the support roller 63, the tension applying roller 65, the opposing roller 67, and the support roller 69. The drive roller 61 is rotated by a drive unit (not illustrated) including a motor, thereby moving the intermediate transfer belt 62 in a circumferential path in the arrow A direction.

Both ends of each of the first transfer rollers 64 are supported by respective bearings (not illustrated) such that the first transfer roller 64 is rotatable. The outer circumferential surface of the first transfer roller 64 is in contact with an inner circumferential surface of the intermediate transfer belt 62. A voltage having a polarity (positive polarity) opposite to that of the toner image, which is to be transferred onto the intermediate transfer belt 62, is applied to a core (not illustrated) of the first transfer roller 64. Here, each of the photoconductor bodies 72 is grounded. A potential difference is generated between the potential of the photoconductor body 72 and the corresponding one of the first transfer rollers 64. By the action of an electric field generated by the potential difference, the toner image carried on the outer circumferential surface of the photoconductor body 72 is transferred onto the intermediate transfer belt 62 at a first transfer position QA through first transfer.

A belt cleaner 71 is provided outside (side opposite to the drive roller 61 side) the intermediate transfer belt 62. The belt cleaner 71 is in contact with the intermediate transfer belt 62 so as to clean the surface of the intermediate transfer belt 62. The second transfer roller 66 is provided on a side opposite to the opposing roller 67 side with the intermediate transfer belt 62 interposed therebetween. The second transfer roller 66 transfers the toner images on the intermediate transfer belt 62 onto the sheet member P through second transfer.

The second transfer roller 66 includes a cylindrical core (not illustrated) coated with a foamed elastic layer disposed therearound. The core is grounded. A potential difference is generated between the potential of the second transfer roller 66 and that of the opposing roller 67. By the action of an electric field generated by the potential difference, the toner images on the intermediate transfer belt 62 are transferred onto the sheet member P at a second transfer position QB through second transfer.

A transport unit 79 is provided downstream of the second transfer position QB in the transport path 28. The transport unit 79 transports the sheet member P toward the downstream side. The transport unit 79 includes rotatable transport rollers 79A and 79B and an endless transport belt 79C looped over the transport rollers 79A and 79B. The transport roller 79B is rotated by a drive unit (not illustrated) including a motor, thereby moving the transport belt 79C in a circumferential path. The fixing device 80 is provided downstream of the transport unit 79 in the transport path 28.

The fixing device 80 includes a fixing roller 82 and a pressure roller 84. The fixing roller 82 is disposed on a side of the sheet member P where the toner image is formed and includes a heat source (an example of the heat source is a halogen heater (not illustrated)) therein. The pressure roller 84 presses the sheet member P against the fixing roller 82. In the fixing device 80, the sheet member P enters a contact part (nip part), where the fixing roller 82 and the pressure roller 84 are in contact with each other, and is heated and subjected to pressure. Thus, the toner image is fixed onto the sheet member P.

As illustrated in FIG. 12, toner cartridges 88Y, 88M, 88C, and 88K, which respectively contain the yellow (Y), magenta (M), cyan (C), and black (K) toners, are replaceably provided above the respective image forming units 60Y, 60M, 60C, and 60K in the image forming section 14. Each of the toner cartridges 88Y, 88M, 88C, and 88K is connected to a corresponding one of the developing devices 100 (see FIG. 11) such that the color of the toner contained in the toner cartridges 88Y, 88M, 88C, or 88K matches the color of the toner used by the corresponding one of the developing devices 100. Thus, the toner of each color is supplied to the corresponding one of the developing devices 100.

Operation of General Structure

Next, an image forming process in the image forming apparatus 10 is described.

Referring to FIG. 11, when the image forming apparatus 10 is operated, image data read by the document reading unit 16 or received from the outside of the image forming apparatus 10 is output to the exposure devices 76.

Next, the outer circumferential surfaces of the photoconductor bodies 72 having been charged by the charging units 74 are exposed to light emitted from the respective exposure devices 76 in accordance with the image data. Thus, electrostatic latent images are formed on the outer circumferential surfaces of the photoconductor bodies 72 in accordance with the image data for the colors. The electrostatic latent images formed on the outer circumferential surfaces of the photoconductor bodies 72 are developed by the respective developing devices 100 into the toner images of respective colors. The toner images of the respective colors on the outer circumferential surfaces of the photoconductor bodies 72 are transferred onto the intermediate transfer belt 62 by the first transfer rollers 64 through first transfer (multi-transfer).

Meanwhile, the sheet member P having been fed from, for example, the third container 26 and transported through the transport path 28 is transported to the second transfer position QB by the registration roller 38 at timing adjusted to the multi-transfer of the toner images onto the intermediate transfer belt 62. The toner images having been transferred onto the intermediate transfer belt 62 through multi-transfer are transferred onto the sheet member P, which has been transported to the second transfer position QB, by the second transfer roller 66 through second transfer.

Next, the sheet member P, onto which the toner images have been transferred, is transported to the fixing device 80. In the fixing device 80, the toner images are heated and subjected to pressure by the fixing roller 82 and the pressure roller 84 to be fixed onto the sheet member P. The sheet member P, onto which the toner images have been fixed, is ejected to, for example, the sheet output unit 15 (see FIG. 12).

In the case where the images are formed on both sides of the sheet member P, as illustrated in FIG. 12, the images are fixed onto the front side of the sheet member P by the fixing device 80, and after that, the sheet member P is fed into the duplex-printing transport path 29, thereby switching the leading end and the trailing end of the sheet member P. Then, the sheet member P is fed into the transport path 28 again, and the images are formed and fixed on the rear side of the sheet member P.

General Structure of Document Reading Unit

Next, the document reading unit 16 is described.

Figure 7:
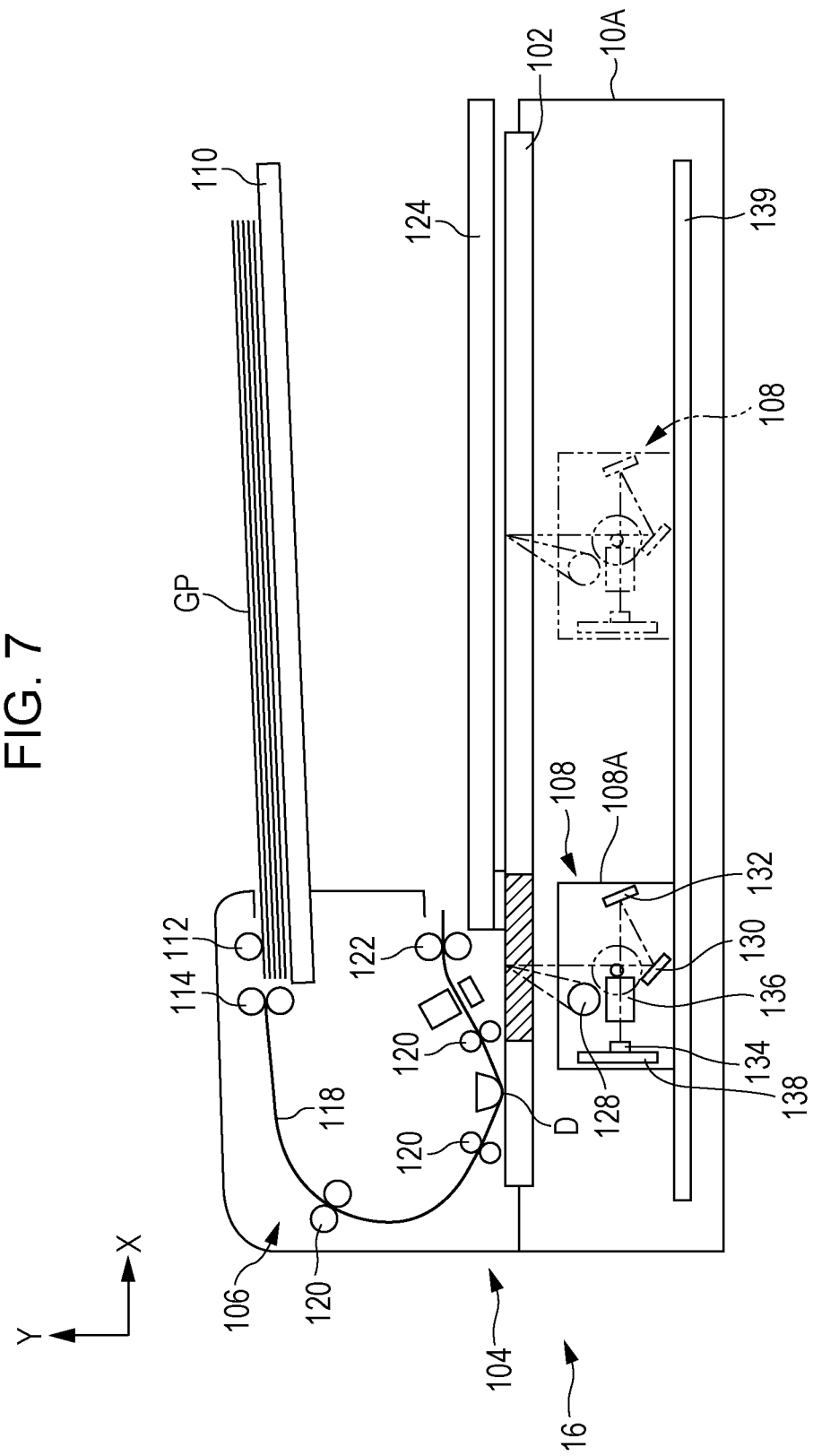
FIG. 7 is a front view illustrating the document reading unit according to the first exemplary embodiment of the present invention.

Referring to FIG. 7, the document reading unit 16 includes a platen glass 102 serving as an example of a reading table, on which the document sheet member GP serving as an example of the document is placed. The platen glass 102 is fitted into an upper portion of the apparatus body 10A. A platen covering 104 is disposed above the platen glass 102. The platen covering 104 serves an example of an openable member. The platen glass 102 is covered or uncovered by closing or opening the platen covering 104. A document transport device 106 (auto document feeder; ADF) serving as an example of a transport member is provided in the platen covering 104. The document transport device 106 transports plural document sheet members GP along a transport path 118 in the platen covering 104 so that the document sheet members GP pass through a document reading position D above the platen glass 102.

Furthermore, a reading unit 108 is provided in the apparatus body 10A. The reading unit 108, which serves as an example of a reading member, reads image information from the document sheet member GP placed on the platen glass 102 and image information from the document sheet member GP, which has been transported to the document reading position D by the document transport device 106.

Platen Covering

As illustrated in FIGS. 10A and 10B, the platen covering 104 is attached to the upper portion of the apparatus body 10A through two hinges 140. When the platen covering 104 is opened and in a state in which the platen glass 102 is uncovered (see FIG. 10B: open state), the document sheet member GP may be placed on the platen glass 102.

In contrast, when the platen covering 104 is closed and in a state in which the platen glass 102 is covered (see FIG. 10A: closed state), the platen covering 104 is caused to press the document sheet member GP placed on the platen glass 102 against the platen glass 102.

Furthermore, the platen covering 104 includes a document tray 110 and an ejection tray 124. The document tray 110 is disposed above the platen glass 102, and the plural document sheet members GP to be transported by the document transport device 106 are placed on the document tray 110. The document sheet members GP having been transported by the document transport device 106 are ejected to the ejection tray 124.

Furthermore, an open and close movement mechanism 142 is provided. The open and close movement mechanism 142 serves as an example of an open and close movement member, which is moved as the platen covering 104 is opened or closed and detected by the detection member 156 when the platen covering 104 is in the open state or closed state. The detection member 156 will be described later.

Open and Close Movement Mechanism

Figure 1A:
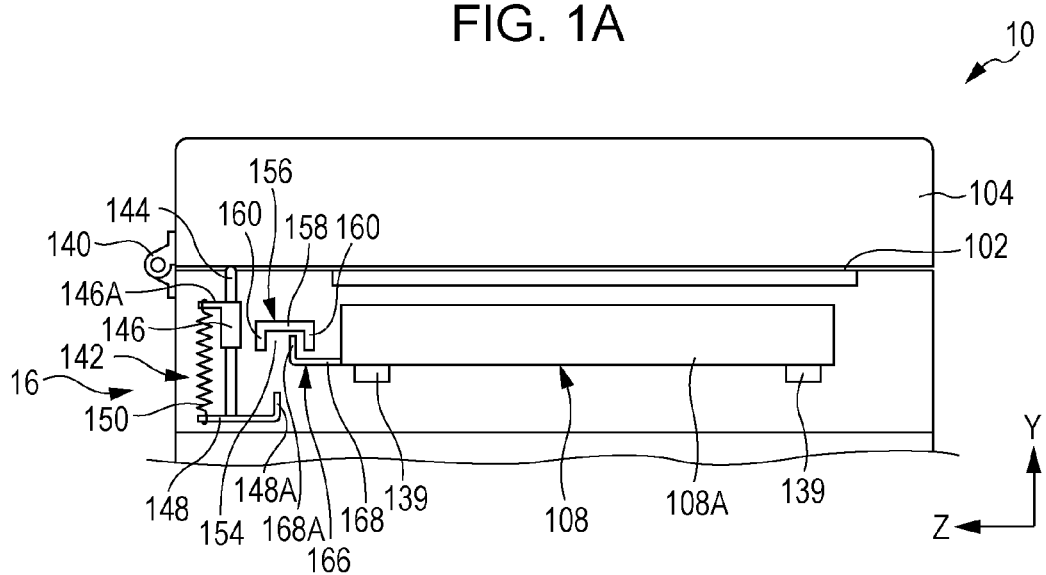
FIGS. 1A and 1B are side views illustrating a document reading unit according to a first exemplary embodiment of the present invention.
Figure 1B:
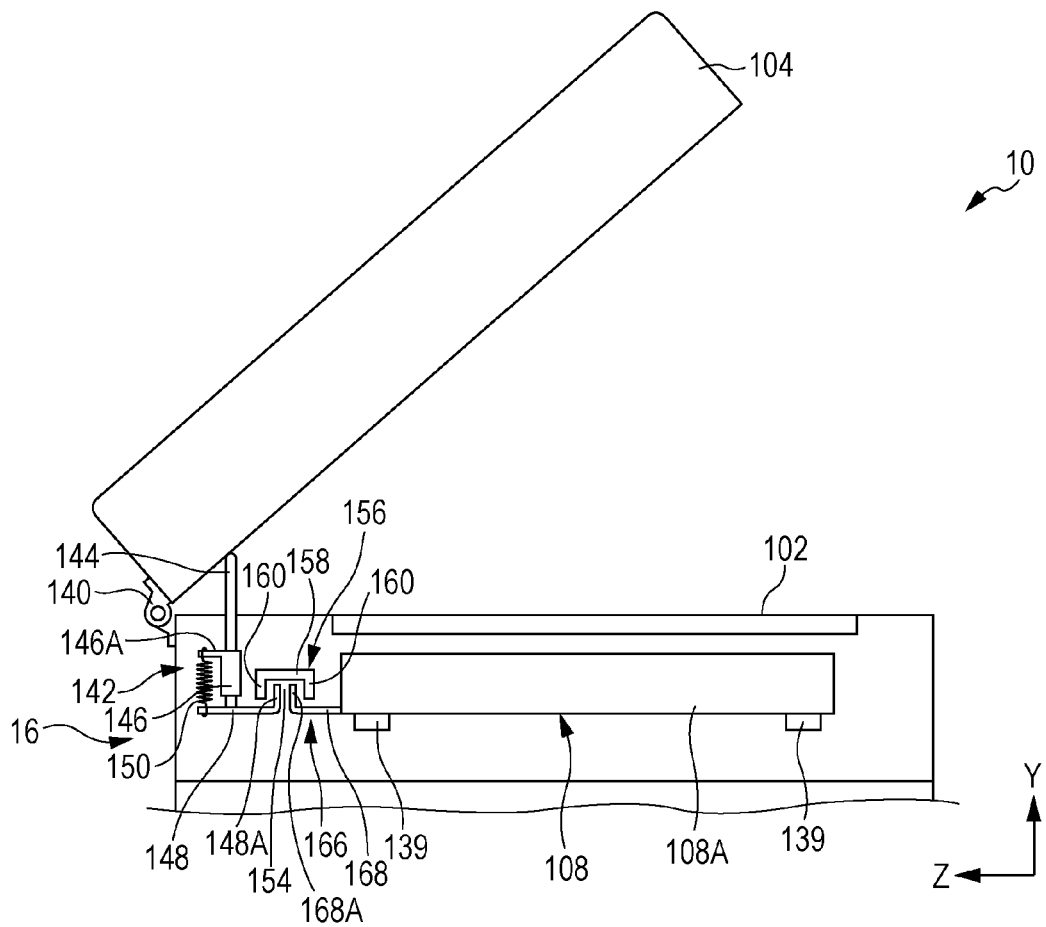

The open and close movement mechanism 142 is, as illustrated in FIGS. 1A and 1B, disposed in a rear portion of the apparatus body 10A in the apparatus depth direction. The open and close movement mechanism 142 includes a rod member 144 and a support member 146. The rod member 144 extends in the apparatus up-down direction, and an upper end portion of the rod member 144 may be brought into contact with a lower surface of the platen covering 104. The support member 146 supports the rod member 144 such that the rod member 144 is movable in the apparatus up-down direction.

Furthermore, an extension plate 148 is secured to a lower end portion of the rod member 144. The extension plate 148 extends in the apparatus depth direction and has a bent portion 148A. A front portion of the bent portion 148A in the apparatus depth direction is bent upward.

Furthermore, a spring 150 is disposed between a rear portion of the extension plate 148 in the apparatus depth direction and a protruding portion 146A that protrudes rearward from the support member 146 in the apparatus depth direction. The spring 150 urges the extension plate 148 so that the upper end portion of the rod member 144 is brought into contact with the lower surface of the platen covering 104.

With the above-described structure, when the platen covering 104 is opened or closed, the rod member 144 is moved in the apparatus up-down direction, thereby moving the extension plate 148 in the apparatus up-down direction.

Detection Member

The detection member 156 detects opening and closing of the platen covering 104 in accordance with the position of the bent portion 148A of the extension plate 148.

Specifically, the detection member 156 has a base plate 158 and a pair of detection plates 160. The base plate 158 extends in the apparatus depth direction when seen in the apparatus width direction. The detection plates 160 extend downward from both end portions of the base plate 158.

One of the detection plates 160 includes a light emitting element (not illustrated) and the other detection plate 160 includes a light receiving element (not illustrated). When the bent portion 148A is positioned at a detection position 154 between the pair of detection plates 160, the detection member 156 detects the bent portion 148A.

Detection of the bent portion 148A using the detection member 156 will be described with operation to be described later.

Reading Unit

The reading unit 108 includes a box-shaped housing 108A that extends in the apparatus depth direction.

As illustrated in FIG. 7, a light source 128 and flat mirrors 130 and 132 are disposed in the housing 108A. The document sheet member GP is illuminated by the light source 128. The light emitted from the light source 128 and reflected by the document sheet member GP is reflected to a predetermined position by the flat mirrors 130 and 132.

Furthermore, a photoelectric conversion element 134 and an imaging lens 136 are disposed in the housing 108A. The photoelectric conversion element 134 converts the light into electrical signals. The imaging lens forms an image of the light reflected by the flat mirrors 130 and 132 on the photoelectric conversion element 134. The document reading unit 16 transmits image information to the exposure devices 76 through a reading circuit board 138 or the like on which the photoelectric conversion element 134 is mounted.

As illustrated in FIGS. 1A and 1B, a pair of rail members 139 are disposed on both sides on the housing 108A in the apparatus depth direction. The rail members 139 support the housing 108A such that the housing 108A is movable in the apparatus width direction.

Furthermore, a reading movement member 166 is provided. As the reading unit 108 is moved, the reading movement member 166 is moved and detected by the detection member 156, which will be described later, when the reading unit 108 is positioned at a reference position of the reading unit 108.

Reading Movement Member

As illustrated in FIGS. 1A and 1B, the reading movement member 166 is attached to a rear part of the housing 108A in the apparatus depth direction and has an extension plate 168. The extension plate 168 extends from the housing 108A in the apparatus depth direction and the rear portion of the extension plate 168 in the apparatus depth direction is bent upward, thereby forming a bent portion 168A.

When the reading unit 108, which is movable in the apparatus width direction, has been moved to the reference position (indicated by solid lines in FIGS. 6 and 7) of the reading unit 108, the bent portion 168A is positioned at the aforementioned detection position 154 and detected by the detection member 156.

The detection member 156 uses an optical detection member. Thus, when, for example, the platen covering 104 is in the open state and the bent portion 148A is positioned at the detection position 154 as illustrated in FIG. 1B, the detection member 156 is unable to detect the bent portion 168A of the reading movement member 166.

Document Transport Device

As illustrated in FIG. 7, the document transport device 106 includes a feed roller 112 and a separation roller 114. The feed roller 112 feeds the plural document sheet members GP placed on the document tray 110 one after another. The separation roller 114 causes each of the document sheet members GP sequentially picked up by the feed roller 112 to be transported one after another.

The document transport device 106 also includes plural transport rollers 120 and an ejection roller 122. The transport rollers 120 transport the document sheet member GP having been fed into the transport path 118 in the platen covering 104 by the separation roller 114 so as to cause the document sheet member GP to pass through the document reading position D above the platen glass 102. The ejection roller 122 ejects the document sheet member GP, which has been transported, to the ejection tray 124 disposed below the document tray 110.

Introduction to Document Transport Device Operation

With the structure having been described, when the reading unit 108 reads the image information of the document sheet member GP transported by the document transport device 106 and passing through the document reading position D, the reading unit 108 is moved to a transport reading position (indicated by solid lines in FIG. 8) that opposes the document reading position D.

When the reading unit 108 reads the image information of the document sheet member GP placed on the platen glass 102, the reading unit 108 is initially moved to a reading start position (indicated by solid lines in FIG. 9) that opposes one end portion of the document sheet member GP. The reading unit 108 is reading the image information of the document sheet member GP while being moved along the document sheet member GP from the reading start position to a reading end position (right position out of positions indicated by two-dot chain lines in FIG. 9).

When detecting the size of the document sheet member GP placed on the platen glass 102, the reading unit 108 is moved to a document detection position (indicated by two-dot chain lines in FIG. 7) between the reading start position and the reading end position. When power of the image forming apparatus 10 is turned off, the reading unit 108 is disposed at the document detection position.

Figure 8:
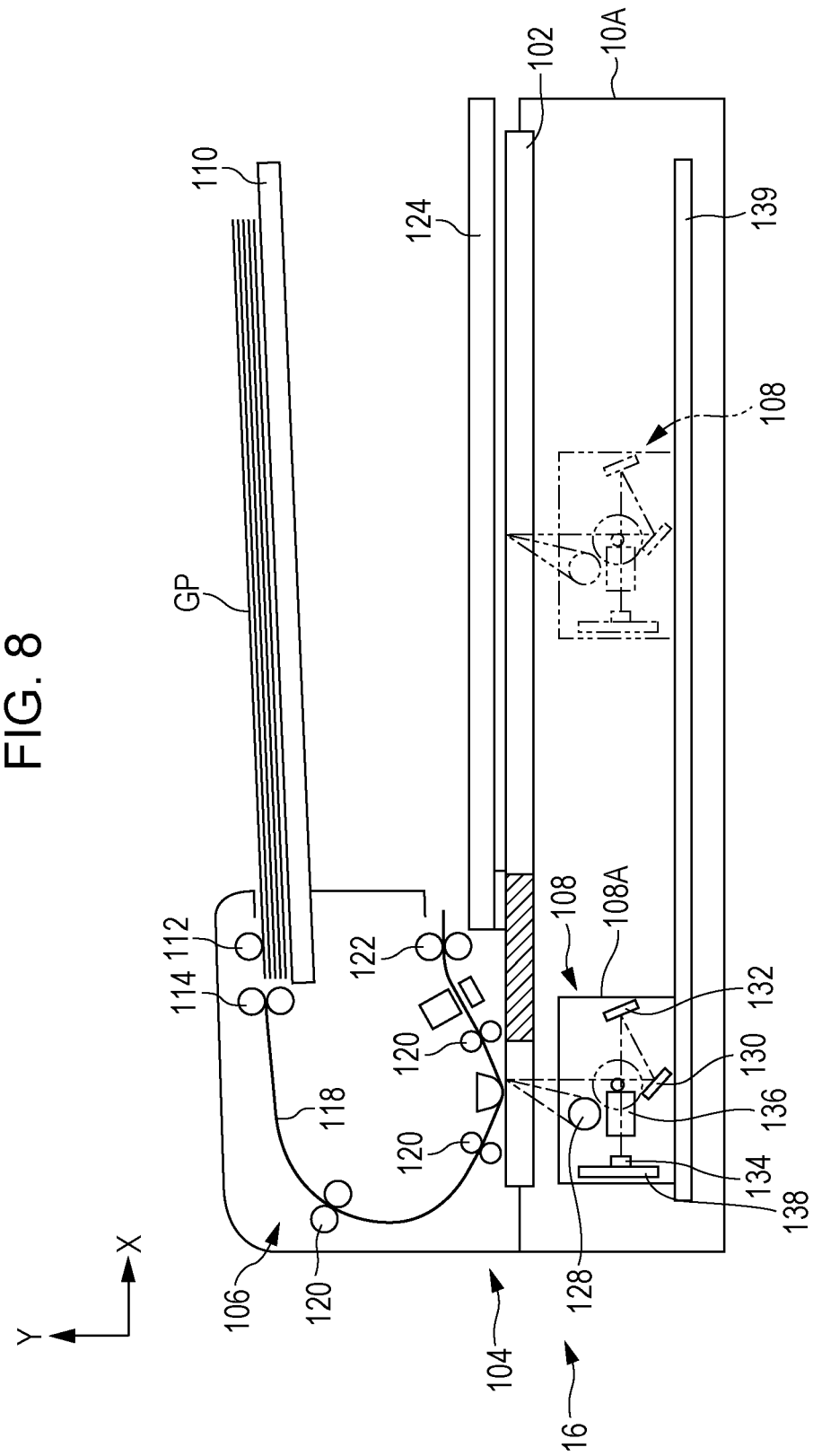
FIG. 8 is a front view illustrating the document reading unit according to the first exemplary embodiment of the present invention.
Figure 9:
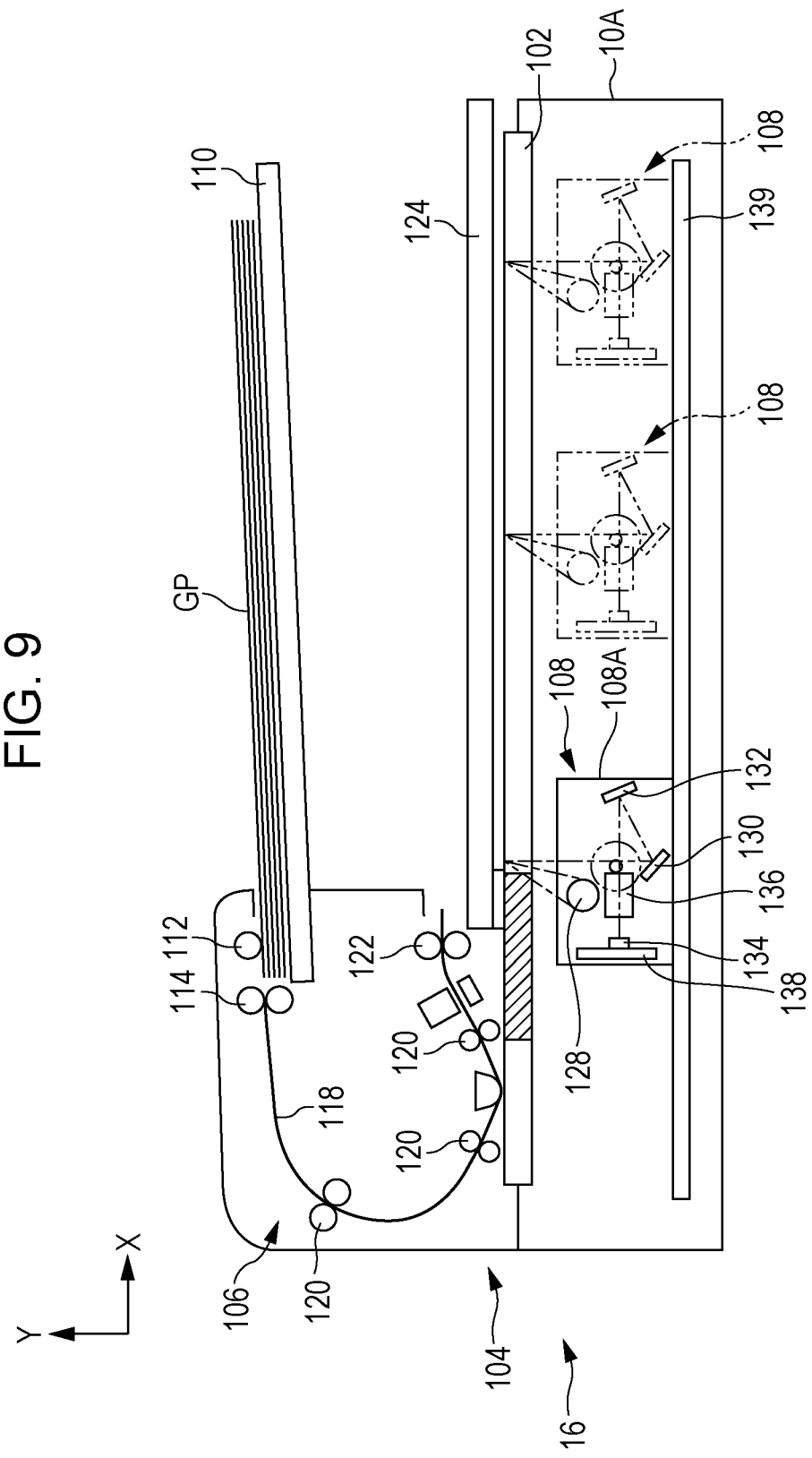
FIG. 9 is a front view illustrating the document reading unit according to the first exemplary embodiment of the present invention.

Referring to FIGS. 7, 8, and 9, the transport reading position (see FIG. 8), the reference position (see FIG. 7), the reading start position (see FIG. 9), the document detection position (see FIG. 9), and the reading end position (see FIG. 9) are set in order from the left in FIGS. 7, 8, and 9. The transport reading position, the reading start position, the document detection position, and the reading end position are set at positions different from the reference position.

Miscellaneous Components and Operations

Figure 4:
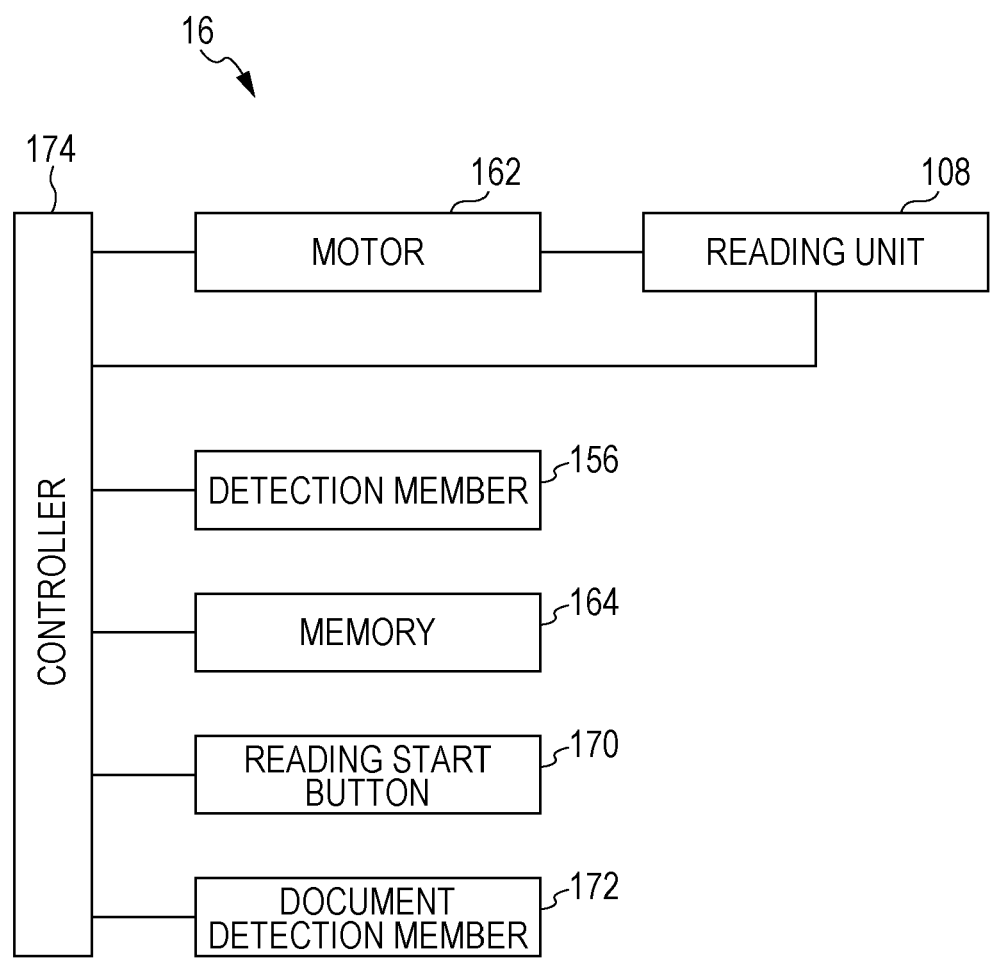
FIG. 4 is a block diagram used to describe control performed by a controller equipped in the document reading unit according to the first exemplary embodiment of the present invention.

The document reading unit 16 includes a motor 162 (see FIG. 4). The motor 162 is a drive source that causes the reading unit 108, which is supported by the rail members 139, to move in the apparatus width direction. The motor 162 uses a stepper motor driven in accordance with pulse signals.

Furthermore, the document reading unit 16 includes a memory 164, which serves as an example of a memory member (see FIG. 4). Position information of the reading unit 108 is stored in the memory 164 when the bent portion 168A of the reading movement member 166 is moved to the detection position 154. Furthermore, the numbers of pulses for the motor 162 corresponding to the movement of the reading unit 108 to each position and the position of the reading unit 108 where the reading unit 108 has been moved from the reference position are stored in the memory 164.

As illustrated in FIG. 4, the document reading unit 16 also includes a controller 174. The controller 174 controls the motor 162 to move the reading unit 108 in accordance with information stored in the memory 164.

Furthermore, the document reading unit 16 includes a reading start button 170 (see FIG. 4). The user presses the reading start button 170 so as to start reading of the document sheet member GP with the reading unit 108. When the reading start button 170 is pressed, the controller 174 controls each component to start the reading of the document sheet member GP with the reading unit 108.

The document reading unit 16 also includes a document detection member 172 that detects the document sheet member GP placed on the document tray 110. When the document sheet member GP placed on the document tray 110 is detected by the document detection member 172, the controller 174 determines that the document sheet member GP to be read by the reading unit 108 is to be transported by the document transport device 106.

Control of each component performed by the controller 174 (control flow) will be described with operation to be described later.

Operation of Document Reading Unit

Next, operation of the document reading unit 16 will be described with reference to control flows in which each component is controlled by the controller 174.

When the power of the image forming apparatus 10 is turned off, the reading unit 108 is positioned (disposed) at the document detection position (indicated by the two-dot chain lines in FIG. 7), where the size of the document sheet member GP placed on the platen glass 102 is detected. That is, the bent portion 168A of the reading movement member 166 is positioned (disposed) at a position different from the detection position 154.

When the power of the image forming apparatus 10 is turned on, processing moves to step 100 in a flow chart illustrated in FIG. 2.

In step 100, the controller 174 determines whether or not the platen covering 104 is in the closed state.

Specifically, when the bent portion 148A of the open and close movement mechanism 142 is positioned at the detection position 154, the detection member 156 detects the bent portion 148A, and the controller 174 determines that the platen covering 104 is in the open state. In contrast, when the bent portion 148A is positioned at a position different from the detection position 154, the detection member 156 is unable to detect the bent portion 148A, and the controller 174 determines that the platen covering 104 is in the closed state (see FIGS. 1A and 1B). If the platen covering 104 is in the closed state, processing moves to step 200.

If the platen covering 104 is in the open state, processing moves to step 150. In step 150, a notification that the platen covering 104 is in the open state is displayed in a display screen (not illustrated) of the document reading unit 16, and processing returns to step 100.

In step 200, the controller 174 controls the motor 162 so as to cause the reading unit 108 to be moved from the document detection position to the reference position (indicated by the solid lines in FIG. 7), and the controller 174 determines whether or not the reading unit 108 has been moved to the reference position.

If the reading unit 108 has been moved to the reference position, processing moves to step 300.

Figure 5:
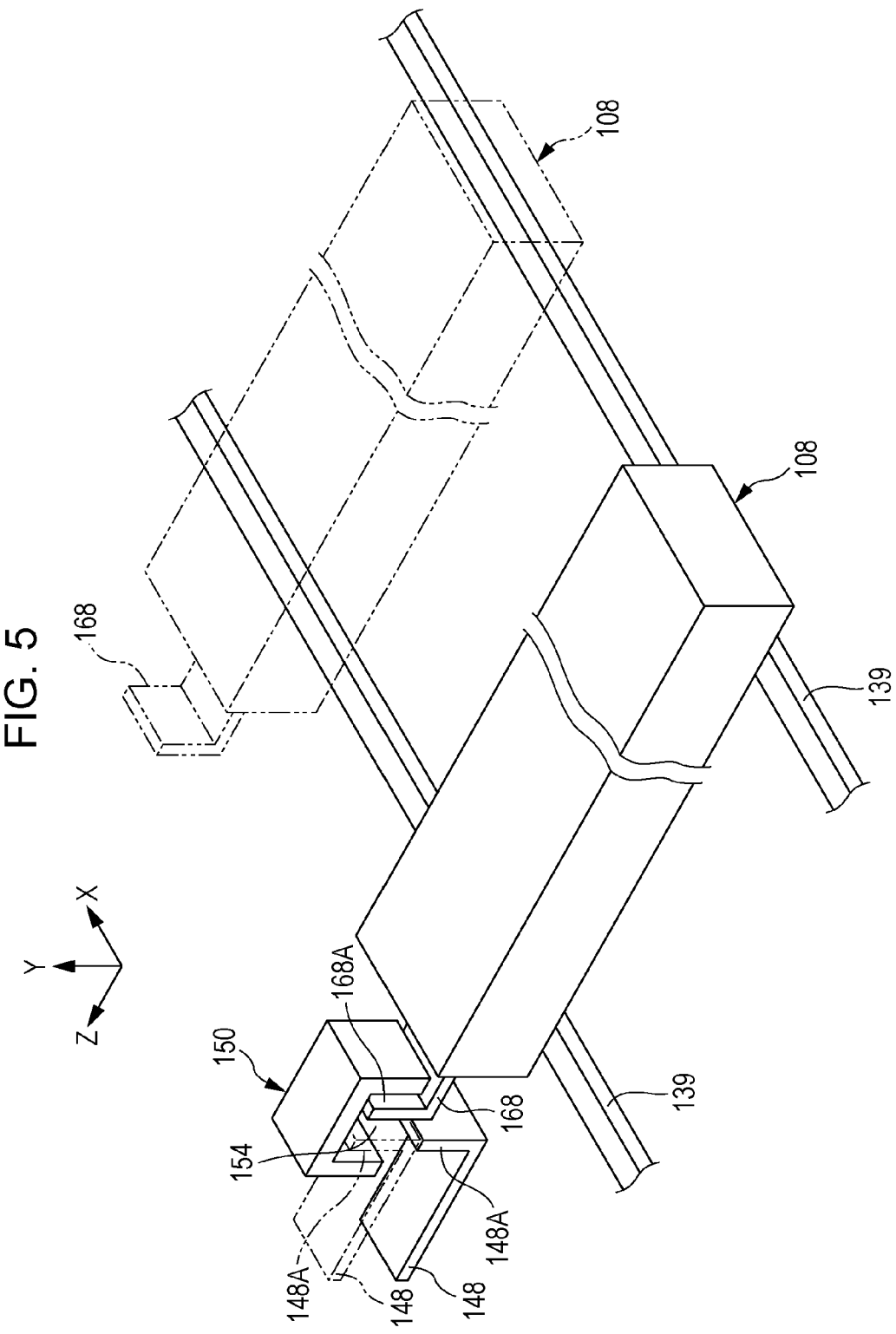
FIG. 5 is a perspective view illustrating a reading unit and the like equipped in the document reading unit according to the first exemplary embodiment of the present invention.
Figure 6:
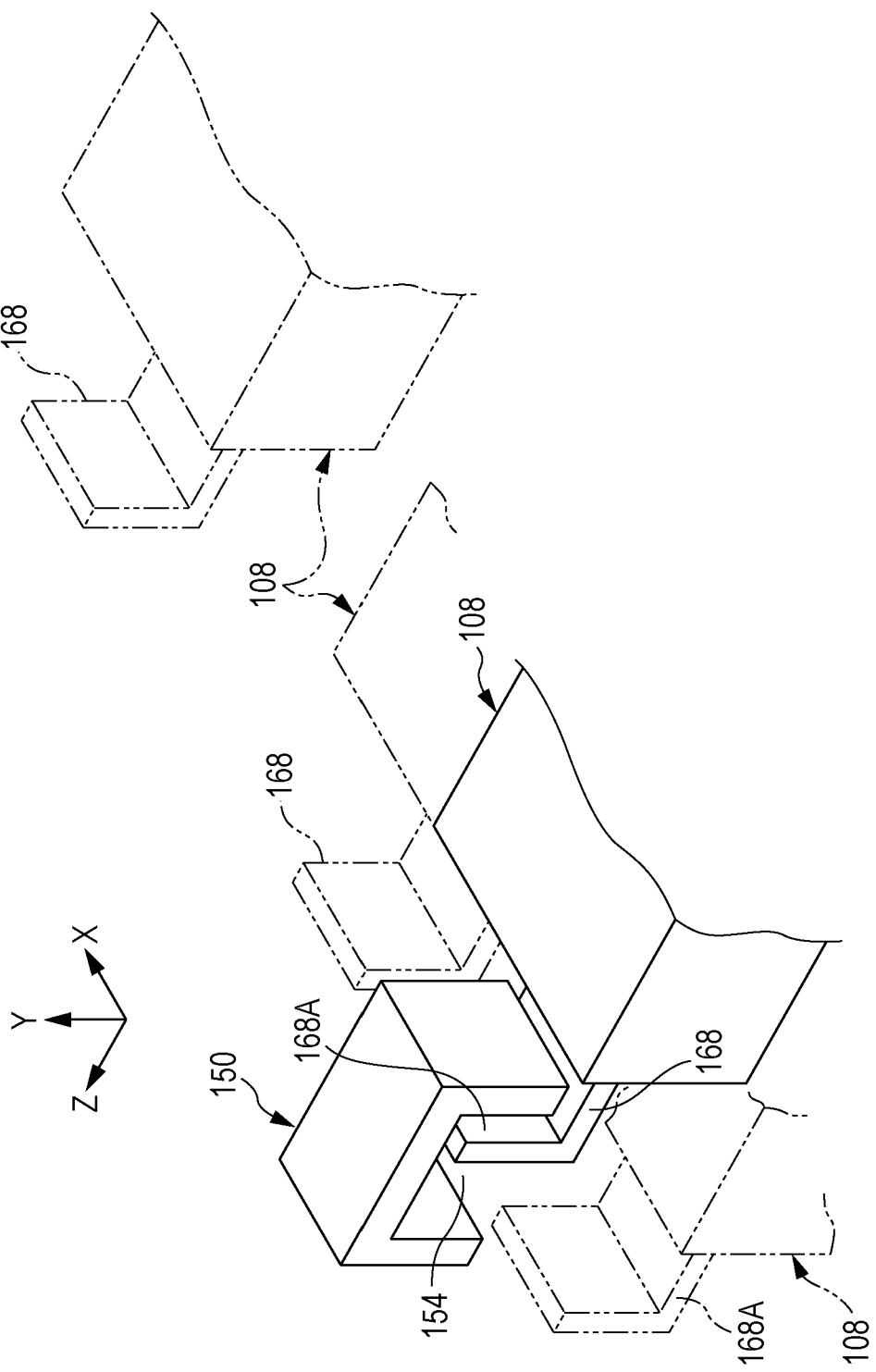
FIG. 6 is an enlarged perspective view illustrating the reading unit and the like equipped in the document reading unit according to the first exemplary embodiment of the present invention.

Specifically, when the controller 174 controls the motor 162 so as to cause the reading unit 108 to be moved from the document detection position to the reference position, the bent portion 168A is, as illustrated in FIG. 5, moved to the detection position 154. The detection member 156 detects the bent portion 168A, thereby the controller 174 causes the motor 162 to stop and determines that the reading unit 108 has been moved to the reference position.

If the controller 174 is unable to determine that the reading unit 108 has been moved to the reference position, the process in step 200 is repeated.

In step 300, information that the reading unit 108 has been moved to the reference position is stored in the memory 164, and processing moves to step 400.

In step 400, the controller 174 controls the motor 162 so as to cause the reading unit 108 to be moved from the reference position to the document detection position, and processing moves to step 500.

Specifically, the controller 174 receives from the memory 164 the number of pulses for the motor 162 corresponding to the movement of the reading unit 108 from the reference position to the document detection position. The controller 174 causes the motor 162 to be rotated in an amount corresponding to the received number of pulses, thereby moving the reading unit 108 from the reference position to the document detection position. Information that the reading unit 108 has been moved to the document detection position is stored in the memory 164.

In step 500, the controller 174 determines whether or not the user presses the reading start button 170 (see FIG. 4) so as to instruct reading of the document sheet member GP.

If the controller 174 determines that the reading of the document sheet member GP is instructed, processing moves to step 600.

If the controller 174 does not determine that the reading of the document sheet member GP is instructed, determination in step 500 is repeated.

Figure 3:
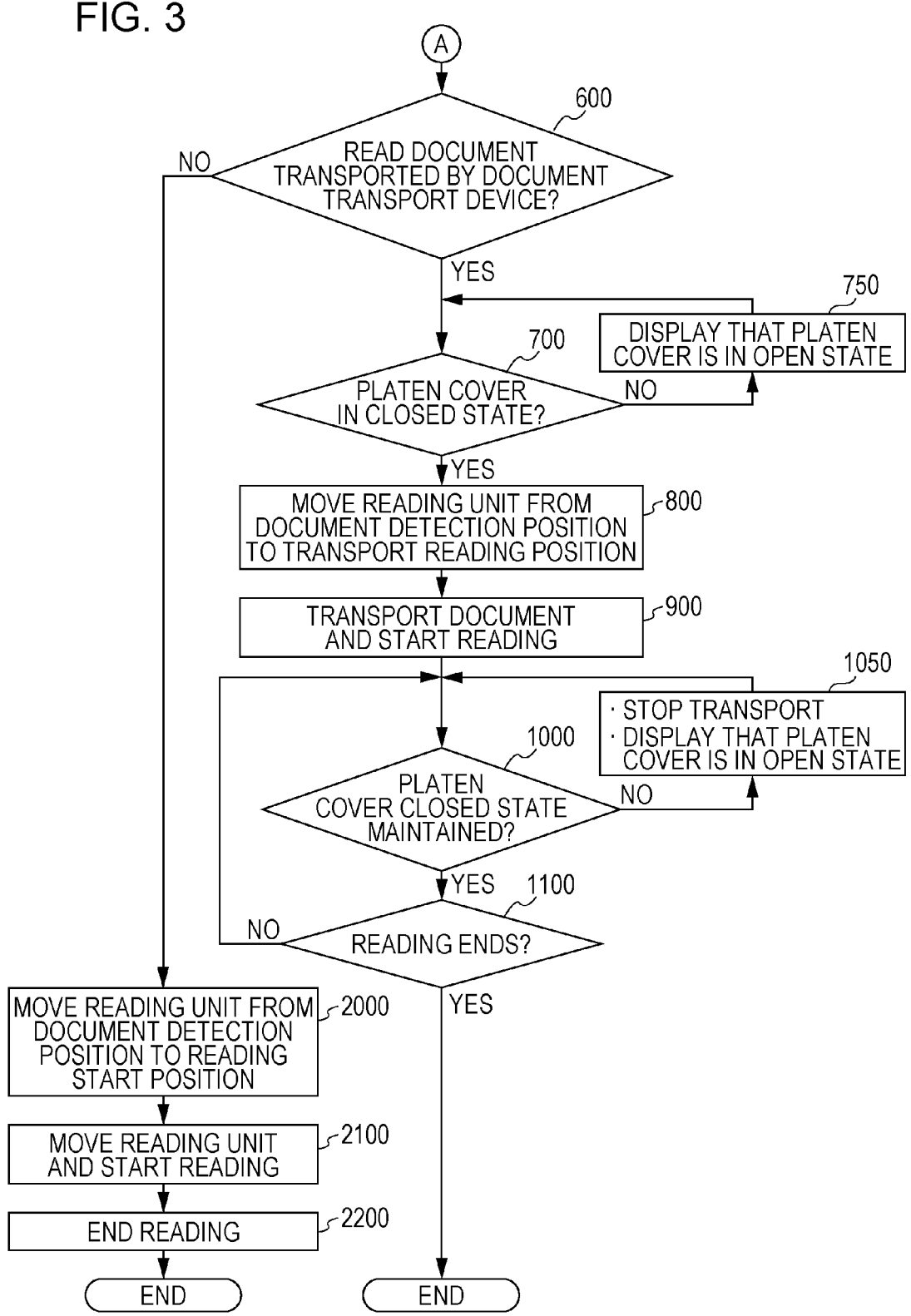
FIG. 3 is a flowchart illustrating part of the flow in which the image is read by the document reading unit according to the first exemplary embodiment of the present invention.

In step 600, as illustrated in FIG. 3, the controller 174 determines whether or not the document sheet member GP to be read by the reading unit 108 is to be transported by the document transport device 106. If the document sheet member GP to be read by the reading unit 108 is to be transported by the document transport device 106, processing moves to step 700.

Specifically, when the document sheet member GP placed on the document tray 110 is detected by the document detection member 172, the controller 174 determines that the document sheet member GP to be read by the reading unit 108 is to be transported by the document transport device 106.

In step 700, similarly to step 100, the controller 174 determines whether or not the platen covering 104 is in the closed state. If the platen covering 104 is in the closed state, processing moves to step 800.

If the platen covering 104 is in the open state, processing moves to step 750. In step 750, a notification that the platen covering 104 is in the open state is displayed in the display screen (not illustrated) of the document reading unit 16, and processing returns to step 700.

In step 800, the controller 174 controls the motor 162 so as to cause the reading unit 108 to be moved from the document detection position to the transport reading position, and processing moves to step 900.

Specifically, the controller 174 receives from the memory 164 the number of pulses for the motor 162 corresponding to the movement of the reading unit 108 from the document detection position to the transport reading position. The controller 174 causes the motor 162 to be rotated in an amount corresponding to the received number of pulses, thereby moving the reading unit 108 from the document detection position to the transport reading position. Information that the reading unit 108 is positioned at the transport reading position is stored in the memory 164.

In step 900, the controller 174 controls the document transport device 106 so as to cause the document sheet member GP placed on the document tray 110 to be transported. The reading unit 108 starts reading of image information of the document sheet member GP at the document reading position D, and processing moves to step 1000.

In step 1000, the controller 174 determines whether or not the closed state of the platen covering 104 is maintained. If the closed state is maintained, processing moves to step 1100.

Specifically, referring to FIGS. 1A and 1B, when the bent portion 148A of the open and close movement mechanism 142 is positioned at the detection position 154, the detection member 156 detects the bent portion 148A, and the controller 174 determines that the platen covering 104 is in the open state. In contrast, when the bent portion 148A is positioned at a position different from the detection position 154, the detection member 156 is unable to detect the bent portion 148A, and the controller 174 determines that the closed state of the platen covering 104 is maintained.

When the closed state of the platen covering 104 is not maintained and the platen covering 104 is opened, processing moves to step 1050. In step 1050, the controller 174 controls the document transport device 106 so as to cause transportation of the document sheet member GP to be stopped. A notification that the platen covering 104 is in the open state is displayed in the display screen (not illustrated) of the document reading unit 16, and processing returns to step 1000.

In step 1100, the controller 174 determines whether or not reading of the document sheet member GP performed by the reading unit 108 has ended. If the reading has ended, the controller 174 causes the reading unit 108 to be moved to the document detection position and ends a flow of operations.

Specifically, the document detection member 172 detects that there is no longer the document sheet member GP on the document tray 110, and accordingly, the controller 174 determines that the reading of the document sheet member GP performed by the reading unit 108 has ended.

When the reading of the document sheet member GP performed by the reading unit 108 has not ended, processing returns to step 1000.

In contrast in step 600, when the document sheet member GP to be read by the reading unit 108 is not to be transported by the document transport device 106, that is, if the controller 174 determines that the document sheet member GP to be read by the reading unit 108 is placed on the platen glass 102, processing moves to step 2000.

Specifically, when the document detection member 172 is unable to detect the document sheet member GP placed on the document tray 110, the controller 174 determines that the document sheet member GP to be read by the reading unit 108 is placed on the platen glass 102.

In step 2000, the size of the document sheet member GP placed on the platen glass 102 is detected by the reading unit 108 having been moved to the document detection position, and the controller 174 receives this size information. Furthermore, the controller 174 controls the motor 162 so as to cause the reading unit 108 to be moved from the document detection position to the reading start position, and processing moves to step 2100.

Specifically, the controller 174 receives from the memory 164 the number of pulses for the motor 162 corresponding to the movement of the reading unit 108 from the document detection position to the reading start position. The controller 174 causes the motor 162 to be rotated in an amount corresponding to the received number of pulses, thereby moving the reading unit 108 from the document detection position to the reading start position (see FIG. 9). Information that the reading unit 108 has been moved to the reading start position is stored in the memory 164.

In step 2100, the controller 174 controls the motor 162 so as to cause the reading unit 108 to start to be moved from the reading start position to the reading end position. The controller 174 causes the moving reading unit 108 to start reading of image information of the document sheet member GP placed on the platen glass 102, and processing moves to step 2200.

In step 2200, when the reading unit 108 has been moved to the reading end position and the reading of the image information of the document sheet member GP performed by the reading unit 108 ends, the controller 174 causes the reading unit 108 to be moved from the reading end position to the document detection position and ends a flow of operations.

Summarization of Operation

As described above, the open and closed states of the platen covering 104 and the reading unit 108 having been moved to the reference position are detected by the detection member 156.

Since the open and closed states of the platen covering 104 and the reading unit 108 having been moved to the reference position are detected by a single detection member 156, the number of components is reduced and the costs of the structures of the image forming apparatus 10 and the document reading unit 16 are reduced.

When, the reading unit 108 is moved to the reference position in step 200 and information that the reading unit 108 has been moved to the reference position is stored on the memory 164 in step 300, the reading unit 108 is moved from the reference position to the document detection position in step 400. With such a movement of the reading unit 108 to the document detection position, the detection member 156 becomes able to detect the open and closed states of the platen covering 104 again.

Furthermore, when the platen covering 104 is in the closed state, the bent portion 148A is positioned at a position different from the detection position 154. Thus, the reading unit 108 having been moved to the reference position may be detected by the detection member 156 without opening the platen covering 104 in the closed state.

Second Exemplary Embodiment

Next, examples of the document reading device and the image forming apparatus according to a second exemplary embodiment of the present invention will be described with reference to FIGS. 13 and 14. The same elements as those of the first exemplary embodiment are denoted by the same reference signs and description thereof is omitted. Most of the following description is dedicated to the differences between the first and second exemplary embodiments.

Figure 13:
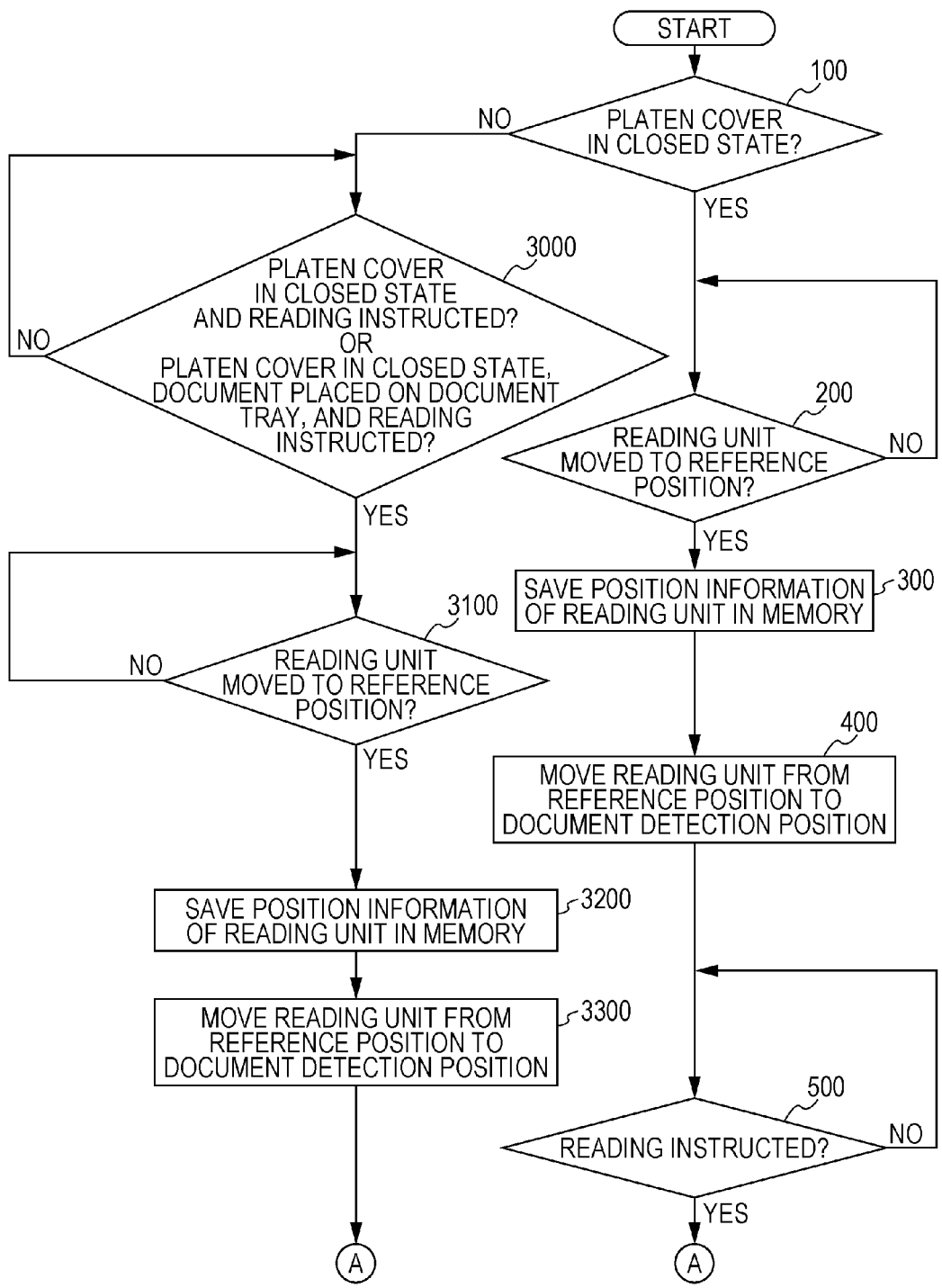
FIG. 13 is a flowchart illustrating part of a flow in which an image is read by a document reading unit according to a second exemplary embodiment of the present invention.
Figure 14:
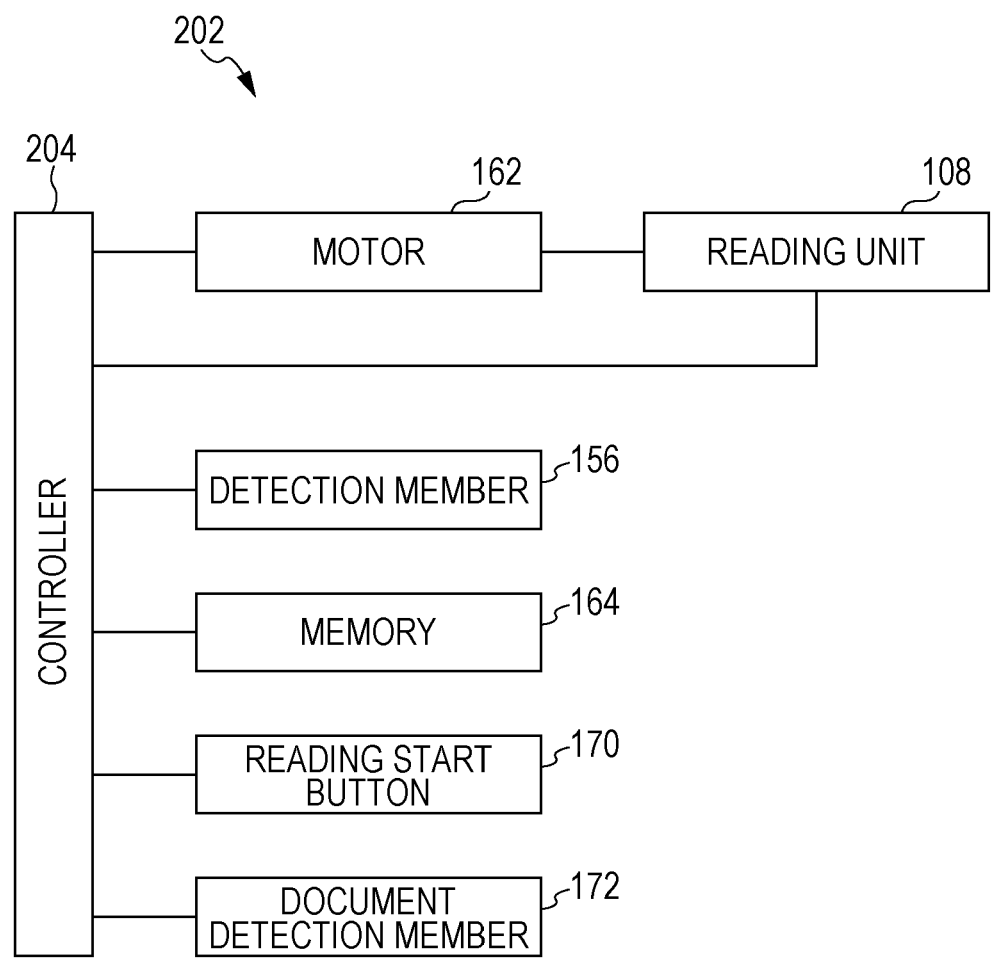
FIG. 14 is a block diagram used to describe control performed by a controller equipped in the document reading unit according to the second exemplary embodiment of the present invention.

Referring to FIG. 14, a controller 204 is provided in a document reading unit 202, which serves as an example of the document reading device. The structure of the controller 204 is described with a flow chart illustrated in FIG. 13.

As illustrated in FIG. 13, if the controller 204 determines that the platen covering 104 is in the open state in step 100, processing moves to step 3000.

If the controller 204 determines that the platen covering 104 is in the closed state, processing moves to step 200, and, after that, a flow similar to that of the first exemplary embodiment is performed.

In step 3000, for example, the document sheet member GP is placed on the platen glass 102 by the user, and the controller 204 determines whether or not the platen covering 104 is in the closed state and reading of the document sheet member GP has been instructed.

In another case in step 3000, the controller 204 determines whether or not the platen covering 104 is in the closed state, the document sheet member GP is placed on the document tray 110, and the reading of the document sheet member GP has been instructed.

If the controller 204 determines that the reading of the document sheet member GP has been instructed through a series of the processes, processing moves to step 3100.

Specifically, the closed state of the platen covering 104 is detected by the detection member 156 when the bent portion 148A of the open and close movement mechanism 142 is positioned at a position different from the detection position 154, and accordingly, the controller 204 determines that the platen covering 104 is in the closed state.

When the document detection member 172 detects that the document sheet member GP placed on the document tray 110, the controller 204 determines that the document sheet member GP is placed on the document tray 110.

When the reading start button 170 is pressed by the user, the controller 204 determines that the reading of the document sheet member GP is instructed.

If the controller 204 does not determine that the reading of the document sheet member GP is instructed through a series of the processes, the processes in step 3000 is repeated.

In step 3100, similarly to step 200, the controller 204 controls the motor 162 so as to cause the reading unit 108 to be moved from the document detection position to the reference position (indicated by the solid lines in FIG. 7), and the controller 204 determines whether or not the reading unit 108 has been moved to the reference position.

If the reading unit 108 has been moved to the reference position, processing moves to step 3200.

If the controller 204 is unable to determine that the reading unit 108 has been moved to the reference position, the process in step 3100 is repeated.

In step 3200, information that the reading unit 108 has been moved to the reference position is stored in the memory 164, and processing moves to step 3300.

In step 3300, similarly to step 400, the controller 204 controls the motor 162 so as to cause the reading unit 108 to be moved from the reference position to the document detection position, and processing moves to step 600.

In step 600 and steps after that, processes similar to those of the first exemplary embodiment are performed.

Other operations are similar to those of the first exemplary embodiment.

Third Exemplary Embodiment

Next, examples of the document reading device and the image forming apparatus according to a third exemplary embodiment of the present invention will be described with reference to FIGS. 15 and 16. The same elements as those of the first exemplary embodiment are denoted by the same reference signs and description thereof is omitted. Most of the following description is dedicated to the differences between the first and third exemplary embodiments.

A document reading unit 208 that serves as an example of the document reading device according to the third exemplary embodiment includes an open and close movement mechanism 210 that serves as an example of the open and close movement member.

Open and Close Movement Mechanism

The open and close movement mechanism 210 is, as illustrated in FIGS. 16A and 16B, disposed in the rear portion of the apparatus body 10A in the apparatus depth direction. The open and close movement mechanism 210 includes a rod member 212 and a support member 214. The rod member 212 extends in the apparatus up-down direction, and an upper end portion of the rod member 212 may be brought into contact with the lower surface of the platen covering 104. The support member 214 supports the rod member 212 such that the rod member 212 is movable in the apparatus up-down direction.

An extension plate 216 is secured to a lower end portion of the rod member 212. The extension plate 216 extends in the apparatus depth direction and has a bent portion 216A. A front portion of the bent portion 216A in the apparatus depth direction is bent downward.

Furthermore, a spring 218 is disposed between a rear portion of the extension plate 216 in the apparatus depth direction and a protruding portion 214A that protrudes rearward from the support member 214 in the apparatus depth direction. The spring 218 urges the extension plate 216 so that the upper end portion of the rod member 212 is brought into contact with the lower surface of the platen covering 104.

Detection Member

A detection member 220 detects opening and closing of the platen covering 104 in accordance with the position of the bent portion 216A.

Specifically, the detection member 220 has a base plate 222 and a pair of detection plates 224. When seen in the apparatus width direction, the base plate 222 extends in the apparatus depth direction and the detection plates 224 extend upward from both end portions of the base plate 222.

One of the detection plates 224 includes a light emitting element (not illustrated) and the other detection plate 224 includes a light receiving element (not illustrated). When the bent portion 216A is positioned at a detection position 226 between the pair of detection plates 224, the detection member 220 detects the bent portion 216A.

In the present exemplary embodiment, when the platen covering 104 is in the closed state, the bent portion 216A is positioned at the detection position 226 and detected by the detection member 220.

Reading Movement Member

A reading movement member 228 is attached to the rear part of the housing 108A in the apparatus depth direction and has an extension plate 230. The extension plate 230 extends rearward in the apparatus depth direction and the rear portion of the extension plate 230 in the apparatus depth direction is bent downward, thereby forming a bent portion 230A.

When the reading unit 108, which is movable in the apparatus width direction, is positioned at the reference position (indicated by the solid lines in FIG. 7) of the reading unit 108, the bent portion 230A is positioned at the above-described detection position 226 and detected by the detection member 220.

Operation

Next, operation of the document reading unit 208 will be described with reference to control flows in which each component is controlled by a controller 211.

Figure 15:
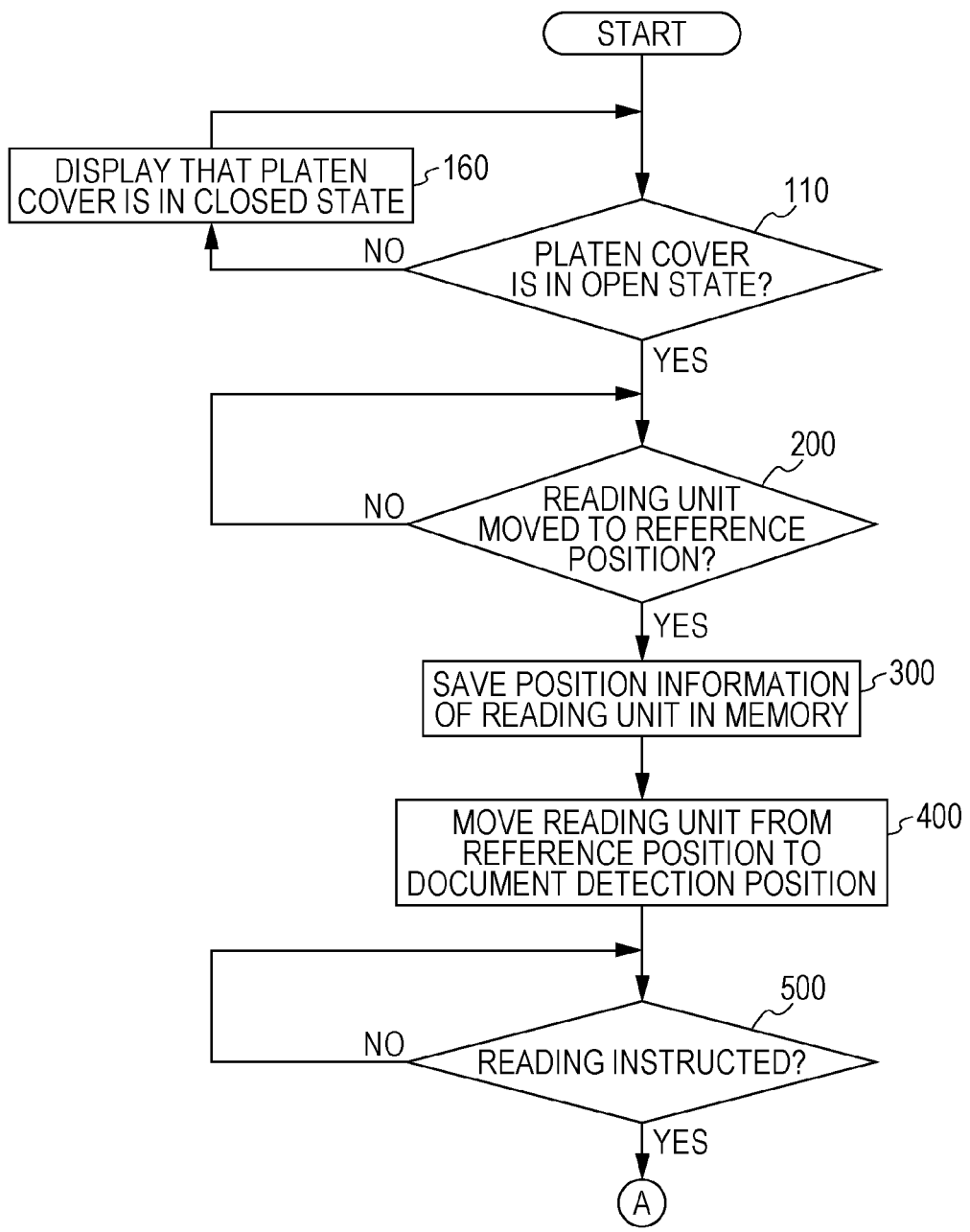
FIG. 15 is a flowchart illustrating part of a flow in which an image is read by a document reading unit according to a third exemplary embodiment of the present invention.

When the power of the image forming apparatus 10 is turned on, processing moves to step 110 in a flow chart illustrated in FIG. 15.

In step 110, the controller 211 determines whether or not the platen covering 104 is in the open state, and if the platen covering 104 is in the open state, processing moves to step 200.

Specifically, when the bent portion 216A of the open and close movement mechanism 210 is positioned at the detection position 226, the detection member 220 detects the bent portion 216A, and the controller 211 determines that the platen covering 104 is in the closed state. In contrast, when the bent portion 216A is positioned at a position different from the detection position 226, the detection member 220 is unable to detect the bent portion 216A, and the controller 211 determines that the platen covering 104 is in the open state.

If the platen covering 104 is in the closed state, processing moves to step 160. In step 160, a notification that the platen covering 104 is in the closed state is displayed in a display screen (not illustrated) of the document reading unit 208, and processing returns to step 110.

In step 200 and steps after that, processes similar to those of the first exemplary embodiment are performed except for determination on maintaining of the closed state of the platen covering 104 in step 1000. In the present exemplary embodiment, whether or not the closed state of the platen covering 104 is maintained is determined based on whether or not the bent portion 216A has been moved to a position different from the detection position 226.

Other operations are similar to those of the first exemplary embodiment.

Fourth Exemplary Embodiment

Next, examples of the document reading device and the image forming apparatus according to a fourth exemplary embodiment of the present invention will be described with reference to FIGS. 17A and 17B. The same elements as those of the third exemplary embodiment are denoted by the same reference signs and description thereof is omitted. Most of the following description is dedicated to the differences between the third and fourth exemplary embodiments.

A document reading unit 240 that serves as an example of the document reading device according to the fourth exemplary embodiment includes an open and close movement mechanism 242 that serves as an example of the open and close movement member.

Open and Close Movement Mechanism

Figure 17A:
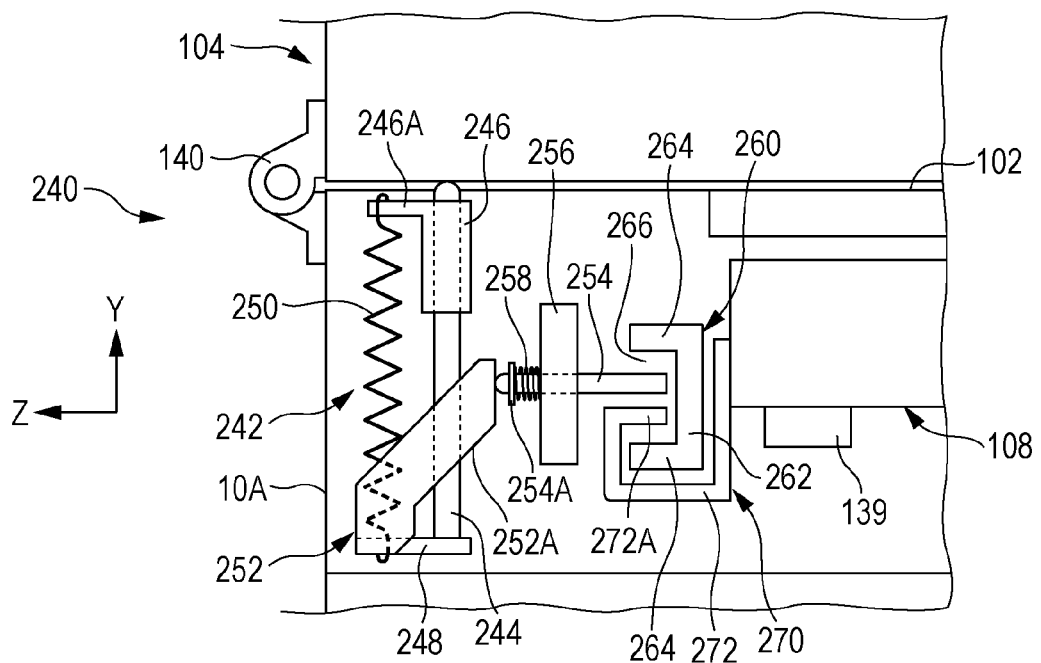
FIGS. 17A and 17B are enlarged front views illustrating part of a document reading unit according to a fourth exemplary embodiment of the present invention.
Figure 17B:
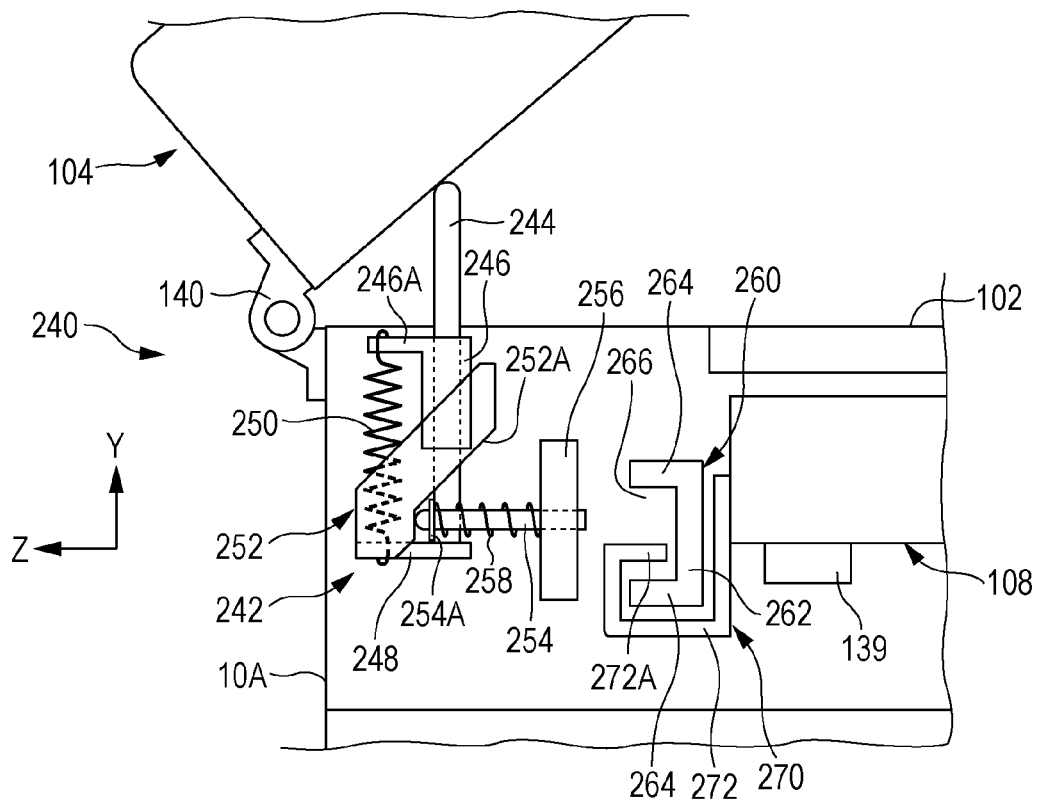

The open and close movement mechanism 242 is, as illustrated in FIGS. 17A and 17B, disposed in the rear portion of the apparatus body 10A in the apparatus depth direction. The open and close movement mechanism 242 includes a rod member 244 and a support member 246. The rod member 244 extends in the apparatus up-down direction, and an upper end portion of the rod member 244 may be brought into contact with the lower surface of the platen covering 104. The support member 246 supports the rod member 244 such that the rod member 244 is movable in the apparatus up-down direction.

An extension plate 248 that extends in the apparatus depth direction is secured to a lower end portion of the rod member 244. Furthermore, a spring 250 is disposed between a rear portion of the extension plate 248 in the apparatus depth direction and a protruding portion 246A that protrudes rearward from the support member 246 in the apparatus depth direction. The spring 250 urges the extension plate 248 so that the upper end portion of the rod member 244 is brought into contact with the lower surface of the platen covering 104.

Furthermore, a guide member 252 having a guide surface 252A is secured to the extension plate 248. The guide surface 252A is, when seen in the apparatus width direction, inclined such that the front portion thereof in the apparatus depth direction is disposed on the upper side, and both end portions thereof face the front side in the apparatus depth direction.

The open and close movement mechanism 242 also includes an extension member 254 and a support member 256. The extension member 254 extends in the apparatus depth direction, and one end portion (end portion on the left in FIGS. 17A and 17B) of the extension member 254 may be in contact with the guide surface 252A. The support member 256 supports the extension member 254 such that the extension member 254 is movable in the apparatus depth direction.

The extension member 254 has a protruding portion 254A that protrudes from an outer peripheral surface of the extension member 254. A spring 258 is disposed between the protruding portion 254A and the support member 256. The spring 258 urges the one end portion of the extension member 254 toward the guide surface 252A.

With the above-described structure, when the platen covering 104 is opened or closed, the one end portion of the extension member 254 is moved along the guide surface 252A, thereby moving the extension member 254 in the apparatus depth direction.

Detection Member

A detection member 260 detects opening and closing of the platen covering 104 in accordance with the movement of the extension member 254.

Specifically, the detection member 260 has a base plate 262 and a pair of detection plates 264. When seen in the apparatus width direction, the base plate 262 extends in the apparatus up-down direction and the detection plates 264 extend rearward in the apparatus depth direction from both end portions of the base plate 262.

One of the detection plates 264 includes a light emitting element (not illustrated) and the other detection plate 264 includes a light receiving element (not illustrated). When the other end portion of the extension member 254 is moved to a detection position 266 between the pair of detection plates 264, the detection member 260 detects the other end portion.

In the present exemplary embodiment, when the platen covering 104 is in the closed state (see FIG. 17A), the other end portion of the extension member 254 is positioned at the detection position 266 and detected by the detection member 220.

Reading Movement Member

A reading movement member 270 is attached to the rear part of the housing 108A in the apparatus depth direction and has a bent plate 272. When seen in the apparatus width direction, the bent plate 272 has plural bent portions and an extension portion 272A, which is provided at an end of the bent plate 272 and extends from the rear side to the front side in the apparatus depth direction.

When the reading unit 108, which is movable in the apparatus width direction, has been moved to the reference position (indicated by the solid lines in FIG. 7) of the reading unit 108, the extension portion 272A is moved to the above-described detection position 266 and detected by the detection member 260.

Operations are similar to those of the third exemplary embodiment.

Fifth Exemplary Embodiment

Next, examples of the document reading device and the image forming apparatus according to a fifth exemplary embodiment of the present invention will be described with reference to FIGS. 18A and 18B. The same elements as those of the third exemplary embodiment are denoted by the same reference signs and description thereof is omitted. Most of the following description is dedicated to the differences between the third and fifth exemplary embodiments.

A document reading unit 320 that serves as an example of the document reading device according to the fifth exemplary embodiment includes an open and close movement mechanism 322 that serves as an example of the open and close movement member.

Open and Close Movement Mechanism

Figure 18A:
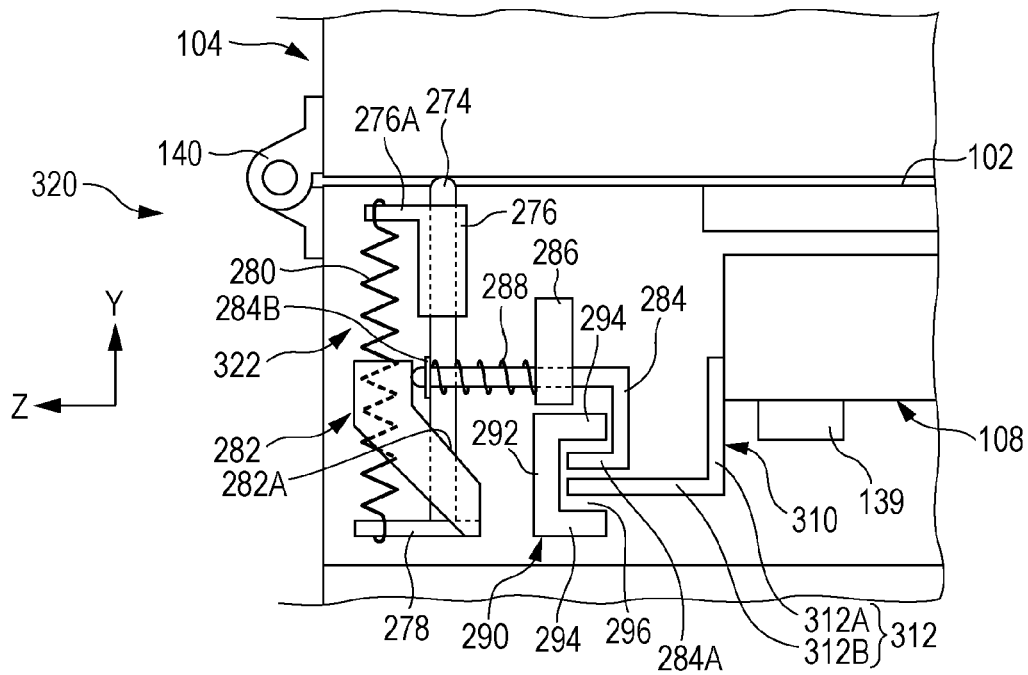
FIGS. 18A and 18B are enlarged front views illustrating part of a document reading unit according to a fifth exemplary embodiment of the present invention.
Figure 18B:
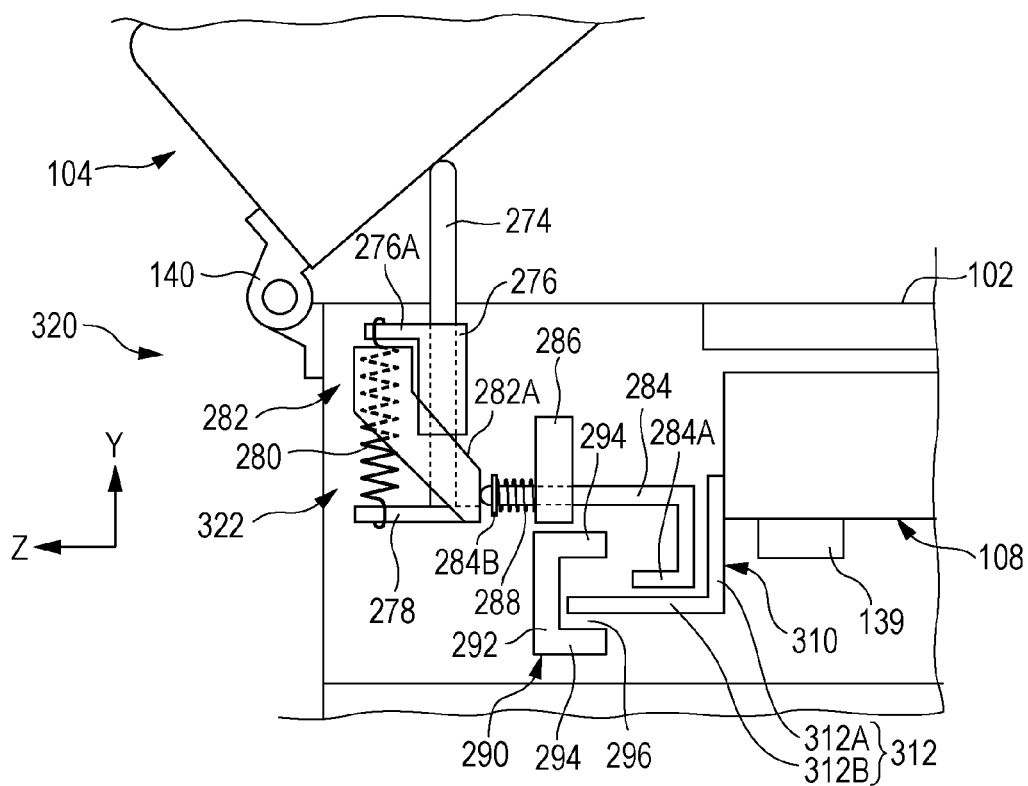

The open and close movement mechanism 322 is, as illustrated in FIGS. 18A and 18B, disposed in the rear portion of the apparatus body 10A in the apparatus depth direction. The open and close movement mechanism 322 includes a rod member 274 and a support member 276. The rod member 274 extends in the apparatus up-down direction, and an upper end portion of the rod member 274 may be brought into contact with the lower surface of the platen covering 104. The support member 276 supports the rod member 274 such that the rod member 274 is movable in the apparatus up-down direction.

An extension plate 278 that extends in the apparatus depth direction is secured to a lower end portion of the rod member 274. A spring 280 is disposed between a rear portion of the extension plate 278 in the apparatus depth direction and a protruding portion 276A that protrudes rearward from the support member 276 in the apparatus depth direction. The spring 280 urges the extension plate 278 so that the upper end portion of the rod member 274 is brought into contact with the lower surface of the platen covering 104.

Furthermore, a guide member 282 having a guide surface 282A is secured to the extension plate 278. The guide surface 282A is, when seen in the apparatus width direction, inclined such that the front portion thereof in the apparatus depth direction is disposed on the lower side, and both end portions thereof face the front side in the apparatus depth direction.

The open and close movement mechanism 322 also includes an extension member 284 and a support member 286. The extension member 284 extends in the apparatus depth direction, and one end portion (end portion on the left in FIGS. 18A and 18B) of the extension member 284 may be in contact with the guide surface 282A. The other end portion (end portion on the right in FIGS. 18A and 18B) of the extension member 284 is folded. The support member 286 supports the extension member 284 such that the extension member 284 is movable in the apparatus depth direction. The portion of the extension member 284 folded at the other end portion of the extension member 284 defines a folded portion 284A.

The extension member 284 has a protruding portion 284B that protrudes from an outer peripheral surface of the extension member 284. A spring 288 is disposed between the protruding portion 284B and the support member 286. The spring 288 urges the one end portion of the extension member 284 toward the guide surface 282A.

With the above-described structure, when the platen covering 104 is opened or closed, the one end portion of the extension member 284 is moved along the guide surface 282A, thereby moving the extension member 284 in the apparatus depth direction.

Detection Member

A detection member 290 detects opening and closing of the platen covering 104 in accordance with the movement of the extension member 284.

Specifically, the detection member 290 has a base plate 292 and a pair of detection plates 294. When seen in the apparatus width direction, the base plate 292 extends in the apparatus up-down direction and the detection plates 294 extend forward in the apparatus depth direction from both end portions of the base plate 292.

One of the detection plates 294 includes a light emitting element (not illustrated) and the other detection plate 294 includes a light receiving element (not illustrated). When the folded portion 284A of the extension member 284 is moved to a detection position 296 between the pair of detection plates 294, the detection member 290 detects the folded portion 284A.

In the present exemplary embodiment, when the platen covering 104 is in the closed state (see FIG. 18A), the folded portion 284A of the extension member 284 is moved to the detection position 296 and detected by the detection member 290.

Reading Movement Member

A reading movement member 310 is attached to the rear part of the housing 108A in the apparatus depth direction and has a bent plate 312, which has a downward extending portion 312A and an extension portion 312B. When seen in the apparatus width direction, the downward extending portion 312A extends downward in the apparatus up-down direction and the extension portion 312B extends rearward in the apparatus depth direction from a lower end portion of the downward extending portion 312A.

When the reading unit 108, which is movable in the apparatus width direction, has been moved to the reference position (indicated by the solid lines in FIG. 7) of the reading unit 108, the extension portion 312B is positioned at the above-described detection position 296 and detected by the detection member 290.

Operations are similar to those of the third exemplary embodiment.

Although specific embodiments of the present invention have been described, the present invention is not limited to these embodiments. It is clearly understood by practitioners skilled in the art that various other embodiments are possible without departing from the scope of the present invention. For example, in the description of each of the exemplary embodiments, the controller is provided in the document reading unit separately from the controller 20 of the image forming apparatus 10. However, the controller may be an integrated single controller.

Also in each of the exemplary embodiments, the detection member includes the light emitting element and the light receiving element that opposes the light emitting element. However, the light emitting and receiving elements do not necessarily oppose each other. The light emitting and receiving elements may be disposed on the same side. In this case, the detection member detects an object to be detected by receiving light reflected by the object.

The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A document reading device comprising:
a reading table on which a document is provided;
an openable member configured to cover or uncover the reading table by closing or opening, respectively;
a detection member provided at a detection position;
an open-and-close-movement member configured to move according to movement of the openable member the detection member configured to detect the open-and-close-movement member positioned at the detection position according to the openable member being in an open state or a closed state;
a reading member configured to read the document provided on the reading table while the reading member is being moved by a drive force transmitted to the reading member;
a reading movement member configured to be moved according to movement of the reading member, the detection member configured to detect the reading movement member positioned at the detection position, the detection position corresponding to the reading member being positioned at a reference position; and
a controller configured to control the drive force to move the reading movement member to the detection position in response to the open-and-close-movement member being in a position different from the detection position.

2. The document reading device according to claim 1, further comprising:

a memory configured to store position information of the reading member, the position information comprising a position of the reading movement member positioned at the detection position, wherein, in response to the position information of the reading member being stored in the memory, the controller is configured to control the drive force so as to cause the reading member to be moved to a position different from the reference position.

3. The document reading device according to claim 1, wherein the open-and-close-movement member is moved to a position different from the detection position in response to the openable member being in the closed state.

4. The document reading device according to claim 1, further comprising:

a transport member disposed in the openable member, the transport member configured to transport the document in response to the openable member being in the closed state, wherein, in response to reading the document transported by the transport member, the controller is configured to control the drive force to move the reading member to a transport reading position at which the document transported by the transport member is read, and wherein, in response to reading the document placed on the reading table, the controller is configured to control the drive force to move the reading member along the document placed on the reading table.

5. An image forming apparatus comprising:

the document reading device according to claim 1; and an image forming section configured to form an image on a recording medium in accordance with document information read by the document reading device.

6. The document reading device according to claim 1, wherein the detection member comprises a single detection member configured to determine an open-or-close state of the openable member and configured to detect a relative position of the reading member with respect to the detection member.

7. The document reading device according to claim 1, wherein the reading movement member protrudes from the reading member.

* * * * *